(12) United States Patent
Du

(10) Patent No.: US 11,546,774 B2
(45) Date of Patent: Jan. 3, 2023

(54) METHODS, SYSTEMS, APPARATUSES, AND DEVICES FOR CONTROLLING ACCESS TO AN ACCESS CONTROL LOCATION

(71) Applicant: James Zheng Du, Irvine, CA (US)

(72) Inventor: James Zheng Du, Irvine, CA (US)

( * ) Notice: Subject to any disclaimer, the term of this patent is extended or adjusted under 35 U.S.C. 154(b) by 67 days.

(21) Appl. No.: 17/065,507

(22) Filed: Oct. 7, 2020

(65) Prior Publication Data

US 2021/0105616 A1 Apr. 8, 2021

Related U.S. Application Data

(60) Provisional application No. 62/911,641, filed on Oct. 7, 2019.

(51) Int. Cl.
| | |
|---|---|
| *H04W 12/72* | (2021.01) |
| *H04W 4/50* | (2018.01) |
| *H04W 12/48* | (2021.01) |
| *G07C 9/00* | (2020.01) |
| *H04W 12/63* | (2021.01) |
| *H04W 12/06* | (2021.01) |

(52) U.S. Cl.
CPC ........ *H04W 12/72* (2021.01); *G07C 9/00309* (2013.01); *H04W 4/50* (2018.02); *H04W 12/068* (2021.01); *H04W 12/48* (2021.01); *H04W 12/63* (2021.01); *G07C 2009/00341* (2013.01); *G07C 2009/00492* (2013.01)

(58) Field of Classification Search
CPC ............. H04W 4/80; H04W 48/00–04; H04W 88/02–06; H04W 92/16; H04W 92/18; H04W 4/00–029; H04W 4/50–80; H04W 8/08–245; G07C 9/000309; G07C 2009/00341; G07C 2009/00492
See application file for complete search history.

(56) References Cited

U.S. PATENT DOCUMENTS

| | | | |
|---|---|---|---|
| 8,843,598 B2 | 9/2014 | Singhal et al. | |
| 9,706,415 B2 | 7/2017 | Ponnuswamy | |
| 2002/0180582 A1* | 12/2002 | Nielsen | G07C 9/21 340/5.6 |
| 2007/0090921 A1* | 4/2007 | Fisher | G07C 9/00896 340/5.5 |
| 2014/0068247 A1* | 3/2014 | Davis | H04L 63/0428 713/182 |
| 2014/0375421 A1* | 12/2014 | Morrison | H04W 12/065 340/5.61 |

(Continued)

*Primary Examiner* — San Htun

(57) ABSTRACT

A method for controlling access to a restricted resource is provided. The method may include receiving, by a cloud server, an identifier from a user device over a long range wireless channel. Further, the method may include comparing the identifier with a plurality of identifiers registered with an access control device. Further, the method may include authenticating the user device based on the comparing and subsequently transmitting a code to the user device upon successful authenticating. Thereafter, the user device may transmit the code to the access control device over a short range wireless channel. Further, the access control device may be configured to provide access to the restricted resource based on receiving of the code. Further, the method may include transmitting the code to the access control device over a long range wireless channel so that the access control device may authenticate the user device.

17 Claims, 24 Drawing Sheets

(56) References Cited

U.S. PATENT DOCUMENTS

| | | | |
|---|---|---|---|
| 2016/0197727 A1* | 7/2016 | Narendra | H04L 9/3271 |
| | | | 713/168 |
| 2017/0103597 A1* | 4/2017 | Fisher | G07C 9/00309 |
| 2018/0262891 A1* | 9/2018 | Wu | H04W 12/065 |

* cited by examiner

METHODS, SYSTEMS, APPARATUSES, AND DEVICES FOR CONTROLLING ACCESS TO AN ACCESS CONTROL LOCATION

The current application claims a priority to the U.S. Provisional Patent application Ser. No. 62/911,641 filed on Oct. 7, 2019.

FIELD OF THE INVENTION

Generally, the present disclosure relates to the field of data processing. More specifically, the present disclosure relates to methods, systems, apparatuses, and devices for controlling access to an access control location.

BACKGROUND OF THE INVENTION

Existing techniques for controlling access to an access control location are deficient with regard to several aspects. For instance, current technologies do not eliminate the need for the wire networking infrastructure that may be needed in a multi-point access control system. Furthermore, current technologies do not provide multiple ways of accessing the access control location.

Therefore, there is a need for improved methods, systems, apparatuses, and devices for controlling access to an access control location that may overcome one or more of the above-mentioned problems and/or limitations. Any modern access control system users can be grouped in two—RFID key card holders and mobile device carriers. The wifi connection is only needed for adding and removing RFID key card numbers to and from the readers which can store more than ten thousand card numbers locally at each reader. When a user places a RFID card next to the access control device, the device functions just like the traditional one—comparing the card number with those already stored in the device and if one matches then the device grants the access. The card numbers are updated in each reader via the wifi connection with an encryption protocol. The security manager sends the update from the cloud server to all the readers simultaneously and the update can either be done instantly or queued for a certain time when wifi connection is available, say 1 am in the morning. The process for RFID users ensures that the users can open door anytime with or without wifi since their numbers are stored in each reader locally and their identity information is protected because its kept in the cloud server which simply matches the card numbers with individual identity. It should be noted wifi connection is not needed for opening the doors and gates and its reliability will not affect the experience of RFID users. The wifi is only used for updating the card numbers in the readers and for uploading the entry records of RFID users.

For mobile device users the system authenticates their identity in the cloud server and then the server sends a bluetooth key to the access control device via the phone to unlock. In this mode no wifi connection is necessary for the users to unlock because it can rely on cellular connection to authenticate and send the key. The specific detail of the process is that the app detects bluetooth signal from the access control devices (if there are multiple ones nearby) and pick one closest in front of the user to authenticate and unlock. Since no user info is stored in the readers only multiple bluetooth keys the number of cell phone credentials for the readers is limitless. Preferably, the invention is capable of storing at least 10,000 card numbers in each reader and the system requires less than one foot of wiring at each control location.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for controlling access to an access control location, in accordance with some embodiments. Accordingly, the method may include receiving, using a communication device, a request associated with at least one access control device from a user device. Further, the request may include an identifier associated with at least one of a user and the user device. Further, the identifier may be unique to the at least one of the user and the user device. Further, the method may include retrieving, using a storage device, a plurality of identifiers associated with at least one of a plurality of users and a plurality of user devices. Further, the method may include comparing, using a processing device, the identifier with the plurality of identifiers. Further, the method may include authenticating, using the processing device, the at least one of the user and the user device based on the comparing. Further, the method may include transmitting, using the communication device, a code to the user device based on the authenticating. Further, the code may be associated with the identifier. Further, the user device may be configurable for transmitting the code to the at least one access control device through at least one short-range communication channel. Further, the at least one access control device may be disposable in at least one access control location. Further, the at least one access control device may include a plurality of codes. Further, the at least one access control device may be configured for receiving the code from the user device through the at least one short-range communication channel. Further, the at least one access control device may be configured for comparing the code with the plurality of codes. Further, the at least one access control device may be configured for transitioning between a locked state and an unlocked state based on the comparing of the code.

Further disclosed herein is a system for controlling access to an access control location, in accordance with some embodiments. Accordingly, the system may include a communication device, a storage device, and a processing device. Further, the communication device may be configured for receiving a request associated with at least one access control device from a user device. Further, the request may include an identifier associated with at least one of a user and the user device. Further, the identifier may be unique to the at least one of the user and the user device. Further, the communication device may be configured for transmitting a code to the user device based on authenticating. Further, the code may be associated with the identifier. Further, the user device may be configurable for transmitting the code to the at least one access control device through at least one short-range communication channel. Further, the at least one access control device may be disposable in at least one access control location. Further, the at least one access control device may include a plurality of codes. Further, the at least one access control device may be configured for receiving the code from the user device through the at least one short-range communication channel. Further, the at least one access control device may be configured for comparing the code with the plurality of codes. Further, the at least one access control device may be configured for transitioning between a locked state and an unlocked state based on the comparing of the code. Further, the storage device may be configured for retrieving a plurality of identifiers associated with at least one of a plurality of users and a plurality of user devices. Further, the processing device may be communicatively coupled with the storage device and the communication device. Further, the processing device may be configured comparing the identifier with the plurality of identifiers. Further, the processing device may be configured authenticating the at least one of the user and the user device based on the comparing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
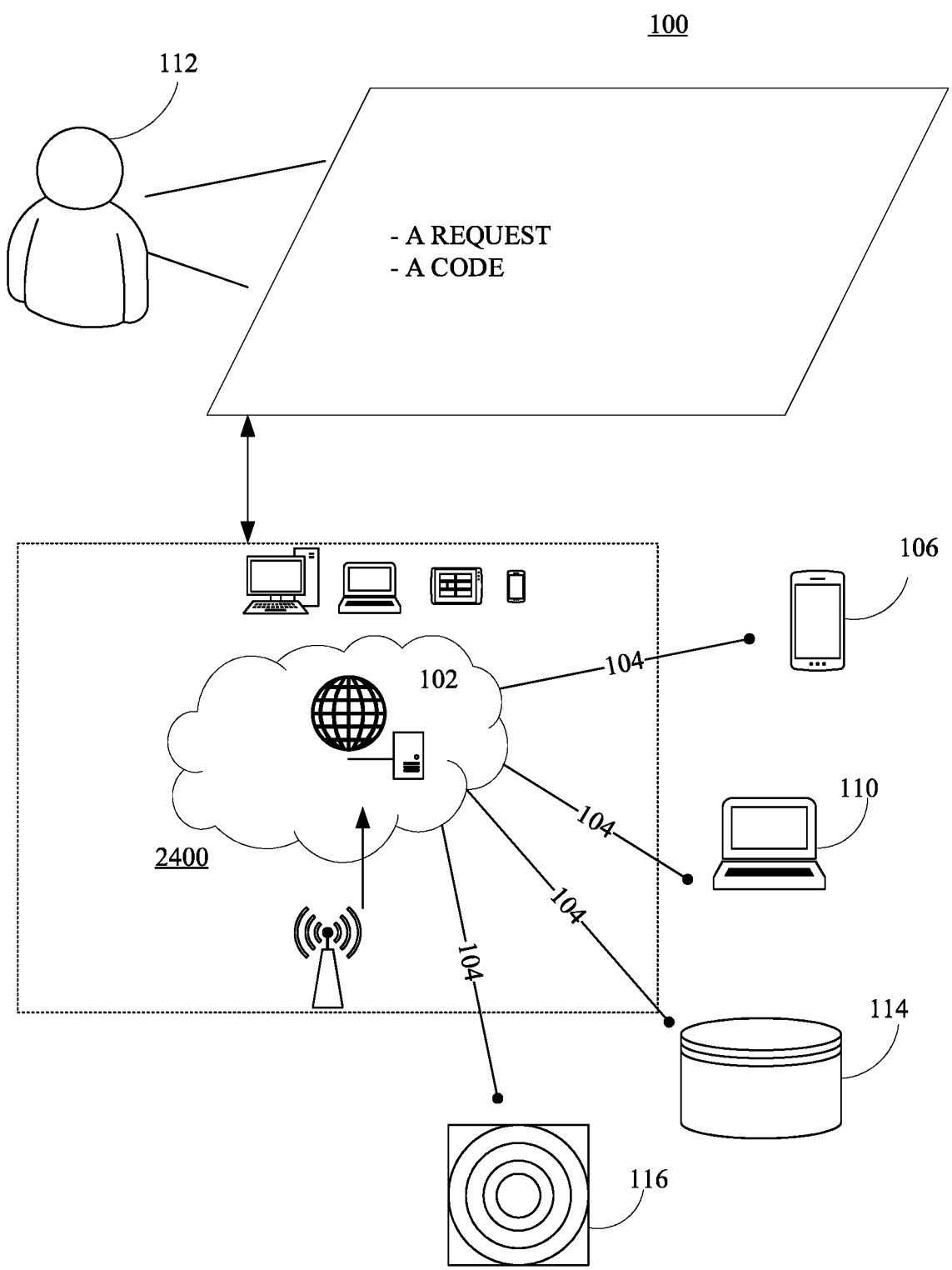
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for controlling access to an access control location, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for controlling access to an access control location. Further, the disclosed system may reduce the cost of building a new and modern access control system for as much as 80% by eliminating the wiring between the readers and the controllers while maintaining the full functionalities of a traditional system and adding modern features for mobile devices. Further, the disclosed system may allow smart device users to open gates and doors with Bluetooth, Wi-Fi, or cellular connections. Further, information may be updated wirelessly of access cards and codes to multiple readers, and keep all entry logs.

Further, the disclosed system may include a wireless cloud access control system that combines traditional RFID card access and mobile device access. Almost all access control systems on the market require wired connections between the card reader and controller so that an access control manager may issue and revoke credentials at desktop terminals for many access-controlled locations at the same time. While some access control systems on the market do support Bluetooth™ access by smart devices, but the wired connections may be required for supporting electronic access cards. Further, the disclosed system may combine both reader traditional access cards and smartphones. Further, the disclosed system may require a low voltage power supply line during the installation. The low voltage and low power (12V or 24V) may be supplied by solar panels and landscape lights.

When a user accesses the reader with a smartphone, the access control is done between the smartphone and the cloud server. Further, the electronic key is issued to the phone to activate the reader and the authentication is done at the phone instead of at the reader. This simplifies the process and enhances security.

Further, the disclosed system may eliminate the wiring except for the low voltage power supply, thus saving infrastructure costs. Further, the disclosed system may offer multiple ways of access control in one unit: access card, smartphones, etc. Further, the disclosed system may not store any electronic keys in the mobile device. Further, the disclosed system may only send an encrypted key from the cloud at the time of access. This setup improves security and efficiency. Further, the disclosed system may notify the manager or resident of the entry of a visitor instantly via cell phone push notification. Further, the disclosed system may be configured for transmitting an app download link, a web link, and/or a code to temporary visitors to open the gate. Further, the disclosed system may serve as a community digital message board. Further, the disclosed system may serve as a community response portal. Further, the disclosed system may eliminate costly trenching and wiring in building entry systems at most gated entry points. Further, the disclosed system may offer biometric access control features such as figure print and facial recognition with traditional ones like a contactless electronic card. Any community, such as homeowner associations, businesses, and hotels that need access control may benefit from such a low cost, high security, and multi-featured disclosed system in which each of the readers connects directly to the cloud associated with the disclosed system.

At a fraction of the cost of access control systems on the market, the disclosed system makes smartphone access control options available to the users who have smart devices (such as) while keeps the traditional electronic card access option for users who do not use smart devices. Further, the disclosed system may bring many upgrades without compromising existing features in an access control system.

Further, the disclosed system may use the direct wireless connection between the readers and the server to administer credentials and to write and erase the electronic access card information in the readers. Further, the disclosed system offers a much easier and cost-effective way to build an access control system. Further, the users of the disclosed system may no longer have to carry an electronic access card. Further, administrators of the disclosed system may communicate to the users besides managing access controls, such as sending messages and announcements for the community.

There are four main scenarios under which a user is given access through the reader that controls various access points. Further, the disclosed system may include one of the readers and a cloud-based server portal.

The disclosed system may include the reader located at each access control point. Each reader is connected to the cloud server directly and individually via Wi-Fi, Ethernet, or LTE. The cloud server may include the user information and the reader hold the access card numbers.

Since the reader is connected directly to the cloud server, the cloud server may send a command to the reader for the access control point. The command may be activated by clicking on a webpage whose link can be sent to a user via email or text message.

The smartphone with the app close to the reader can have the app activated automatically by sensing a Bluetooth™ connection to the reader and then request an electronic key from the cloud server for the access point. Further, the user may perform the task manually by launching the app and then request the electronic key for the access point. In both cases, the cloud server sends the electronic key to an access control reader (or the reader) through the user's smartphone after the server authenticates the smart phone's identity. The key activates the reader with Bluetooth™ connection.

In a situation in which the access control reader does not have a keypad or a user does not wish to use a smart device for access, an electronic access card (key fob) is issued. The user information is stored on the cloud server which writes the card number wirelessly into the reader where the user is authorized to access. The electronic access card information such as numbers is stored locally in the reader.

The reader's keypad allows the user to gain entry by typing in a valid code already stored in the reader or a code saved on the server. For locations with multiple entry points, a code stored in the cloud server may be advantageous because it allows the user to set a single maximum number for combined use among the readers sharing the same code.

Further, the disclosed system functions as a message board so that users with smartphone access may be notified of the community's announcements in real-time.

Further, the disclosed system gets rid of the network infrastructure needed in a multi-point access control system. Further, the disclosed system allows the readers/controllers of this invention to be installed next to the access control points with an electric strike or lock without any network wiring typically required in all the systems on the market. Further, the disclosed system may save customers 80% of the cost of building a new access control system.

The reader-controller combo units associated with the disclosed system may connect to the servers individually through a Wi-Fi router with an encryption protocol. Further, the disclosed system allows a security manager to remotely and wirelessly write electronic key card information into the reader-controller unit that may store up to ten thousand cards. The manager may issue an electronic key card (like an employee ID and access badge) to a new user for all access-controlled entry points without making trips to them to program the card into each of those reader-controller units. Further, the disclosed system may accommodate traditional key card users. Further, the disclosed system may include a new access control system that offers Bluetooth™ options to mobile phone users.

FIG. 1 is an illustration of an online platform 100 consistent with various embodiments of the present disclosure. By way of non-limiting example, the online platform 100 to facilitate controlling access to an access control location may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2400.

In some embodiments, the online platform facilitates authenticating two groups of users in any access control system namely, mobile phone users and key card users.

Accordingly, in some embodiments, the online platform may wirelessly communicate with an access control system, comprising a reader, in order to provide a set of codes based on which the reader may locally authenticate a user device and/or a key card.

In some embodiments, for a mobile phone user, the online platform authenticates the identity of the mobile phone user over a long range communication channel, such as but not limited to, a cellular communication network. Subsequently, upon successful authentication, the online platform sends a code (e.g. a bluetooth key) to the mobile phone, which in turn transmits the code to the reader over a short range communication channel (e.g. Bluetooth) to unlock the access control device. In this instance, a Wi-Fi connection may not be necessary for the mobile phone to unlock because the mobile phone may use a cellular connection to authenticate and send the key. Further, a mobile app executing on the mobile phone may be configured to detect bluetooth signals from a plurality of readers in the vicinity of the mobile phone and pick a reader closest to the mobile phone to authenticate and unlock. Since no user information is stored in the readers, the number of mobile phone users that may be authenticated at a reader is limitless.

Further, in some embodiments, for a key card user the online platform may be configured to transmit key card credentials associated with registered key cards to a reader. Further, the reader may store the key card credentials locally in a memory device comprised in the reader. Accordingly, the reader may be capable of instantly authenticating the key card, but the identity information associated with the key card user may be stored in the online platform (e.g. a cloud server) which is a secure way to protect user identity. In this instance, a Wi-Fi connection (or any other wireless communication channel between the reader and the online platform) may be needed only when a security manager adds and/or removes a key card credential to and from the reader. The process of unlocking is simply presenting the key card in front of the reader. Accordingly, in some embodiments, Wi-Fi connection may not be needed for opening a doors or gate associated with the access control device. Instead, Wi-Fi connectivity may be needed only for writing and erasing key card credentials (or Bluetooth codes) in the readers.

Figure 2:
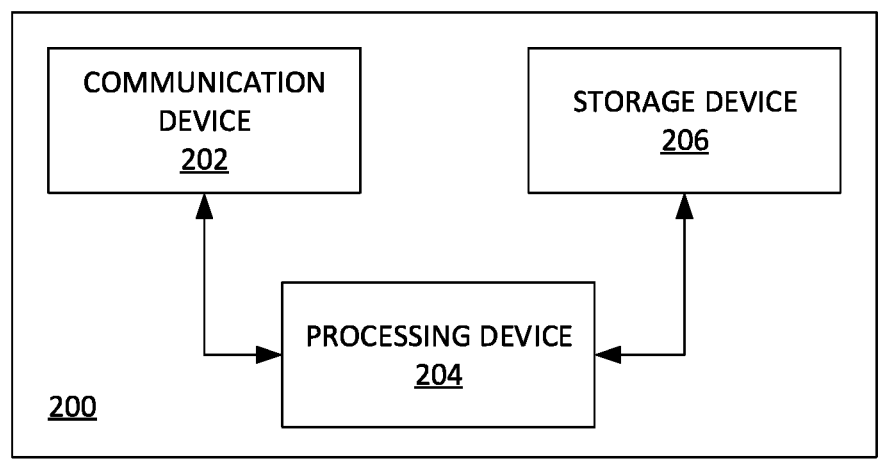
FIG. 2 is a block diagram of a system for controlling access to an access control location, in accordance with some embodiments.

FIG. 2 is a block diagram of a system 200 for controlling access to an access control location, in accordance with some embodiments. Accordingly, the system 200 may include a communication device 202, a storage device 206, and a processing device 204. Further, the communication device 202 may be configured for receiving a request associated with at least one access control device from a user device. Further, the request may include an identifier associated with at least one of a user and the user device. Further, the identifier may be unique to the at least one of the user and the user device. Further, the communication device 202 may be configured for transmitting a code to the user device based on authenticating. Further, the code may include a bar code, a QR code, an NFC code, a Bluetooth code, an RFID code, etc. Further, the code may include at least one character. Further, the at least one character may include at least one alphabet, at least one numeral, at least one alphanumeral, etc. Further, the code may include at least one image. Further, the code may include at least one sound. Further, the code may be associated with the identifier. Further, the user device may be configurable for transmitting the code to the at least one access control device through at least one short-range communication channel. Further, in some embodiments, the user device may not store the code subsequent to transmitting the code to the at least one access control device. Further, the at least one access control device may be disposable in at least one access control location. Further, the at least one access control device may include a plurality of codes. Further, the at least one access control device may be configured for receiving the code from the user device through the at least one short-range communication channel. Further, the at least one access control device may be configured for comparing the code with the plurality of codes. Further, the at least one access control device may be configured for transitioning between a locked state and an unlocked state based on the comparing of the code. Further, the communication device may be configured for transmitting the plurality of codes to the at least one access control device over a long range communication channel, such as but not limited to, Cellular communication network, Wireless Broadband, Wi-Fi, satellite communication and so on. Accordingly, the at least one access control device may include a memory device configured to store the plurality of codes.

Further, the storage device 206 may be configured for retrieving a plurality of identifiers associated with at least one of a plurality of users and a plurality of user devices.

Further, the processing device 204 may be communicatively coupled with the storage device 206 and the communication device 202. Further, the processing device 204 may be configured comparing the identifier with the plurality of identifiers. Further, the processing device 204 may be configured authenticating the at least one of the user and the user device based on the comparing.

Further, in some embodiments, the communication device 202 may be configured for receiving at least one identifier associated with at least one of at least one user and at least one user device from at least one first user device. Further, the communication device 202 may be configured for transmitting at least one code to the at least one access control device through at least one communication channel. Further, the at least one access control device may be configured for including the at least one code based on the transmitting of the at least one code. Further, the processing device 204 may be configured for generating the at least one code corresponding to the at least one of the at least one user and the at least one user device. Further, each code of the at least one code may be unique to at least one of each user of the at least one user and each user device of the at least one user device.

Further, in some embodiments, the user device may be configurable for establishing a connection with the at least one access control device through the at least one short-range communication channel based on a proximity between the user device and the at least one access control device. Further, the user device may be configured for generating the request based on the establishing of the connection. Further, the receiving of the request from the user device may be based on the generating of the request.

Further, in some embodiments, the at least one access control device may be associated with at least one access control device identifier. Further, the user device may be configured for generating the at least one access control device identifier based on the establishing of the connection. Further, the request may include the at least one access control device identifier.

Further, in some embodiments, the processing device 204 may be configured for analyzing the request associated with the at least one access control device. Further, the processing device 204 may be configured for determining at least one request information associated the request based on the analyzing. Further, the processing device 204 may be configured for comparing the at least one request information with at least one access control device information. Further, the authenticating may be based on the comparing of the at least one request information and the at least one access control device information. Further, the storage device 206 may be configured for retrieving the at least one access control device information associated with the at least one access control device. Further, the at least one request information may include a time of the request, a date of the request, a location of the request, etc. Further, the at least one access control device information may include an operating duration of the at least one access control device.

Further, in some embodiments, the storage device 206 may be configured for retrieving at least one of user information and user device information based on the request. Further, the processing device 204 may be configured for comparing the at least one of the user information and the user device information with the at least one access control device information. Further, the authenticating may be based on the comparing of the at least one of the user information and the user device information and the at least one access control device information. Further, the at least one of the user information and the user device information may include a privilege to access the at least one access control device.

Further, in some embodiments, the at least one access control device may be configured for generating at least one access data based on the transitioning between the locked state and the unlocked state. Further, the communication device 202 may be configured for receiving the at least one access data from the at least one access control device through at least one communication channel. Further, the communication device 202 may be configured for transmitting an access notification to at least one second user device. Further, the processing device 204 may be configured for analyzing the at least one access data. Further, the processing device 204 may be configured for identifying the at least one of the user and the user device based on the analyzing. Further, the processing device 204 may be configured for generating the access notification based on the identifying. Further, the storage device 206 may be configured for storing the at least one access data. Further, the at least one access data may include the code and a state of the at least one access control device. Further, the state may include the locked state, the unlocked state, etc.

Further, in some embodiments, the communication device 202 may be configured for receiving at least one access information associated with the at least one of the user and the user device from at least one first user device. Further, the communication device 202 may be configured for transmitting at least one command to the at least one access control device through at least one communication channel. Further, the at least one access control device may be configured for either of including and removing the code based on the at least one command. Further, the processing device 204 may be configured for analyzing the at least one access information. Further, the processing device 204 may be configured for determining at least one of a validity and an applicability of the code for the at least one access control device based on the analyzing. Further, the processing device 204 may be configured for generating the at least one command based on the determining. Further, the at least one access information may include a validity information of the code, an applicability of the code, etc.

Further, in some embodiments, the at least one access control device may be configured for interacting with at least one electronic access card based on an interaction of the at least one electronic access card receivable by at least one card interface comprised in the at least one access control device. Further, the at least one electronic access card may include the code. Further, the at least one access control device may be configured for receiving the code from the at least one electronic access card based on the interacting. Further, the comparing of the code with the plurality of codes may be based on the receiving of the code from the at least one electronic access card. Further, the at least one access control device may be configured for interacting with the at least one electronic access card through at least one card interaction, wherein the at least one card interaction comprises a physical interaction, a non-physical interaction, etc. Further, the physical interaction comprises swiping, inserting, touching, etc. Further, the non-physical interaction comprises positioning the at least one electronic access card in a proximity of the at least one access control device.

In some embodiments, the code may be a key card credential associated with the electronic access card. As a result, in some instances, a first set of credentials for authenticating user devices and a second set of credentials for authenticating electronic access cards may each be stored in the reader. Alternatively, the plurality of codes stored in the reader may be used for authenticating both user devices and electronic access cards.

Further, in some embodiments, the at least one access control device may be configured for receiving a temporary code based on at least one external action receivable by an input device comprised in the at least one access control device. Further, the communication device 202 may be configured for receiving the temporary code from the at least one access control device. Further, the communication device 202 may be configured for transmitting at least one first command to the at least one access control device through at least one communication channel. Further, the transitioning between the locked state and the unlocked state of the at least one access control device may be based on the at least one first command. Further, the storage device 206 may be configured for retrieving a plurality of first codes. Further, the processing device 204 may be configured for comparing the temporary code with the plurality of first codes. Further, the processing device 204 may be configured for authenticating the temporary code based on the comparing. Further, the processing device 204 may be configured for generating the at least one first command based on the authenticating.

Figure 3:
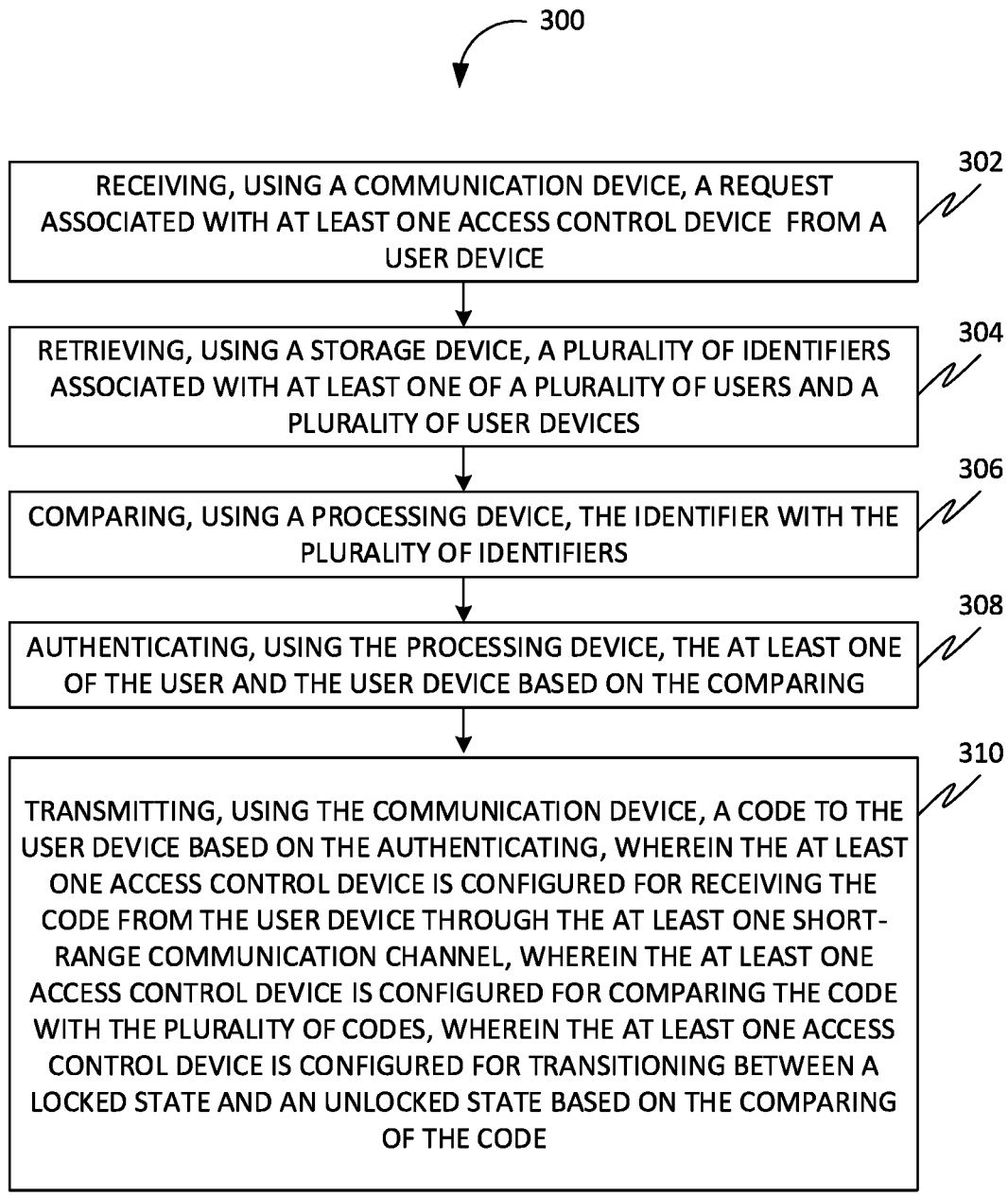
FIG. 3 is a flowchart of a method for controlling access to an access control location, in accordance with some embodiments.

FIG. 3 is a flowchart of a method 300 for controlling access to an access control location, in accordance with some embodiments. Accordingly, at 302, the method 300 may include receiving, using a communication device, a request associated with at least one access control device from a user device. Further, the request may include an identifier associated with at least one of a user and the user device. Further, the identifier may be unique to the at least one of the user and the user device. Further, the at least one access control device may include at least one reader.

Further, at 304, the method 300 may include retrieving, using a storage device, a plurality of identifiers associated with at least one of a plurality of users and a plurality of user devices.

Further, at 306, the method 300 may include comparing, using a processing device, the identifier with the plurality of identifiers.

Further, at 308, the method 300 may include authenticating, using the processing device, the at least one of the user and the user device based on the comparing.

Further, at 310, the method 300 may include transmitting, using the communication device, a code to the user device based on the authenticating. Further, the code may include a bar code, a QR code, an NFC code, a Bluetooth code, an RFID code, etc. Further, the code may include at least one character. Further, the at least one character may include at least one alphabet, at least one numeral, at least one alphanumeral, etc. Further, the code may include at least one image. Further, the code may include at least one sound. Further, the code may be associated with the identifier. Further, the user device may be configurable for transmitting the code to the at least one access control device through at least one short-range communication channel. Further, in some embodiments, the user device may not store the code subsequent to transmitting the code to the at least one access control device. Further, the at least one access control device may be disposable in at least one access control location. Further, the at least one access control device may include a plurality of codes. Further, the at least one access control device may be configured for receiving the code from the user device through the at least one short-range communication channel. Further, the at least one access control device may be configured for comparing the code with the plurality of codes. Further, the at least one access control device may be configured for transitioning between a locked state and an unlocked state based on the comparing of the code. Further, the at least one short-range communication channel may be a wireless short-range communication channel. Further, the at least one short-range communication channel may include a Bluetooth™ communication channel, a RFID communication channel, an NFC communication channel, etc. Further, the at least one access control device may be configured for establishing the at least one short-range communication channel with the user device using at least one wireless transceiver comprised in the at least one access control device. Further, the user device may include a wireless transceiver for facilitating the establishing of the at least one short-range communication channel with the at least one access control device.

Further, in some embodiments, the user device may be configurable for establishing a connection with the at least one access control device through the at least one short-range communication channel based on a proximity between the user device and the at least one access control device. Further, the user device may be configured for generating the request based on the establishing of the connection. Further, the receiving of the request from the user device may be based on the generating of the request.

Further, in some embodiments, the at least one access control device may be associated with at least one access control device identifier. Further, the user device may be configured for generating the at least one access control device identifier based on the establishing of the connection. Further, the request may include the at least one access control device identifier.

Further, in some embodiments, the at least one access control device may be configured for interacting with at least one electronic access card based on an interaction of the at least one electronic access card receivable by at least one card interface comprised in the at least one access control device. Further, the at least one electronic access card may include the code. Further, the at least one access control device may be configured for receiving the code from the at least one electronic access card based on the interacting. Further, the comparing of the code with the plurality of codes may be based on the receiving of the code from the at least one electronic access card.

Further, the at least one access control device may be configured for interacting with the at least one electronic access card through at least one card interaction, wherein the at least one card interaction comprises a physical interaction, a non-physical interaction, etc. Further, the physical interaction comprises swiping, inserting, touching, etc. Further, the non-physical interaction comprises positioning the at least one electronic access card in a proximity of the at least one access control device.

Figure 4:
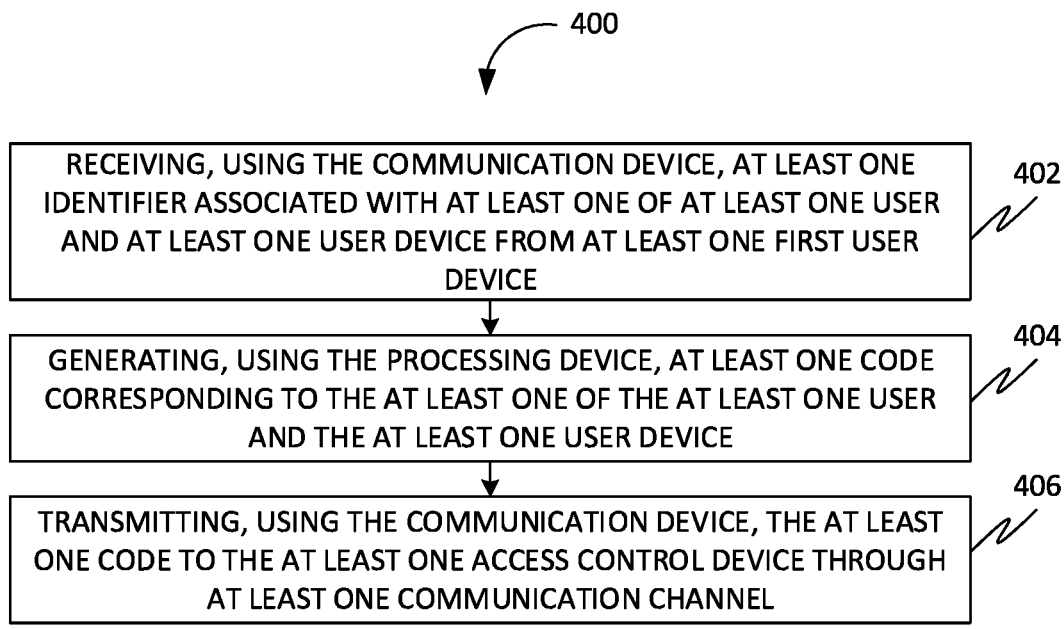
FIG. 4 is a flowchart of a method for generating at least one code corresponding to the at least one of at least one user and at least one user device, in accordance with some embodiments.

FIG. 4 is a flowchart of a method 400 for generating at least one code corresponding to the at least one of at least one user and at least one user device, in accordance with some embodiments. Accordingly, at 402, the method 400 may include receiving, using the communication device, at least one identifier associated with at least one of at least one user and at least one user device from at least one first user device.

Further, at 404, the method 400 may include generating, using the processing device, at least one code corresponding to the at least one of the at least one user and the at least one user device. Further, each code of the at least one code may be unique to at least one of each user of the at least one user and each user device of the at least one user device.

Further, at 406, the method 400 may include transmitting, using the communication device, the at least one code to the at least one access control device through at least one communication channel. Further, the at least one access control device may be configured for including the at least one code based on the transmitting of the at least one code. Further, the at least one communication channel may include at least one wireless communication channel. Further, the at least one communication channel may include a Bluetooth™ communication channel, a RFID communication channel, an NFC communication channel, a Wi-Fi communication channel, etc.

Figure 5:
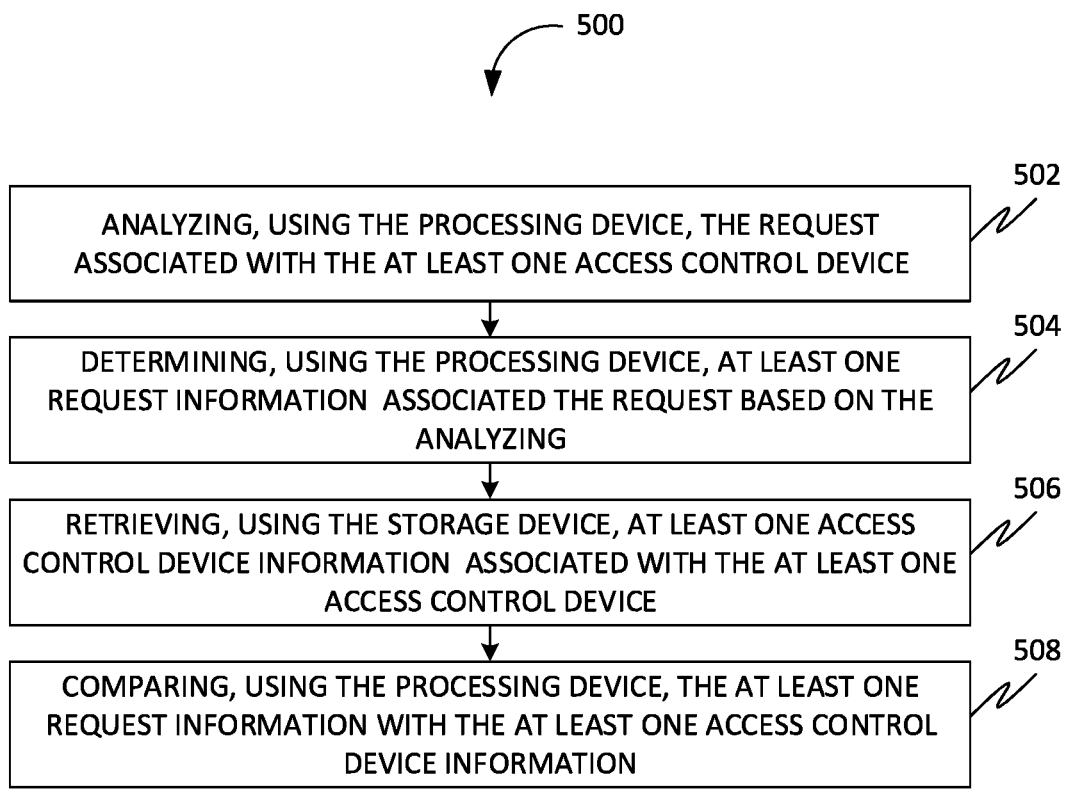
FIG. 5 is a flowchart of a method for comparing at least one request information with at least one access control device information, in accordance with some embodiments.

FIG. 5 is a flowchart of a method 500 for comparing at least one request information with at least one access control device information, in accordance with some embodiments. Accordingly, at 502, the method 500 may include analyzing, using the processing device, the request associated with the at least one access control device.

Further, at 504, the method 500 may include determining, using the processing device, at least one request information associated the request based on the analyzing. Further, the at least one request information may include a time of the request, a date of the request, a location of the request, etc.

Further, at 506, the method 500 may include retrieving, using the storage device, at least one access control device information associated with the at least one access control device. Further, the at least one access control device information may include an operating duration of the at least one access control device.

Further, at 508, the method 500 may include comparing, using the processing device, the at least one request information with the at least one access control device information. Further, the authenticating may be based on the comparing of the at least one request information and the at least one access control device information.

Figure 6:
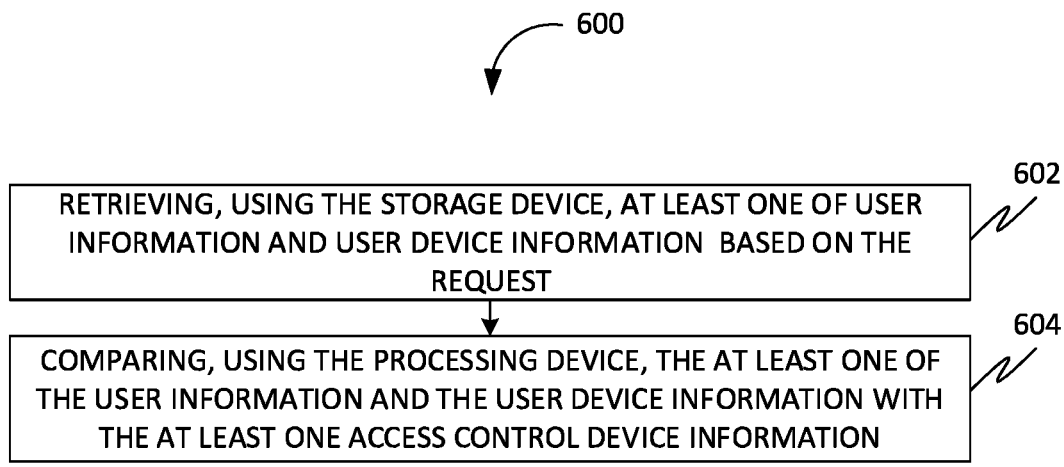
FIG. 6 is a flowchart of a method for comparing the at least one of user information and user device information with the at least one access control device information, in accordance with some embodiments.

FIG. 6 is a flowchart of a method 600 for comparing the at least one of user information and user device information with the at least one access control device information, in accordance with some embodiments. Accordingly, at 602, the method 600 may include retrieving, using the storage device, at least one of user information and user device information based on the request. Further, the at least one of the user information and the user device information may include a privilege to access the at least one access control device.

Further, at 604, the method 600 may include comparing, using the processing device, the at least one of the user information and the user device information with the at least one access control device information. Further, the authenticating may be based on the comparing of the at least one of the user information and the user device information and the at least one access control device information.

Figure 7:
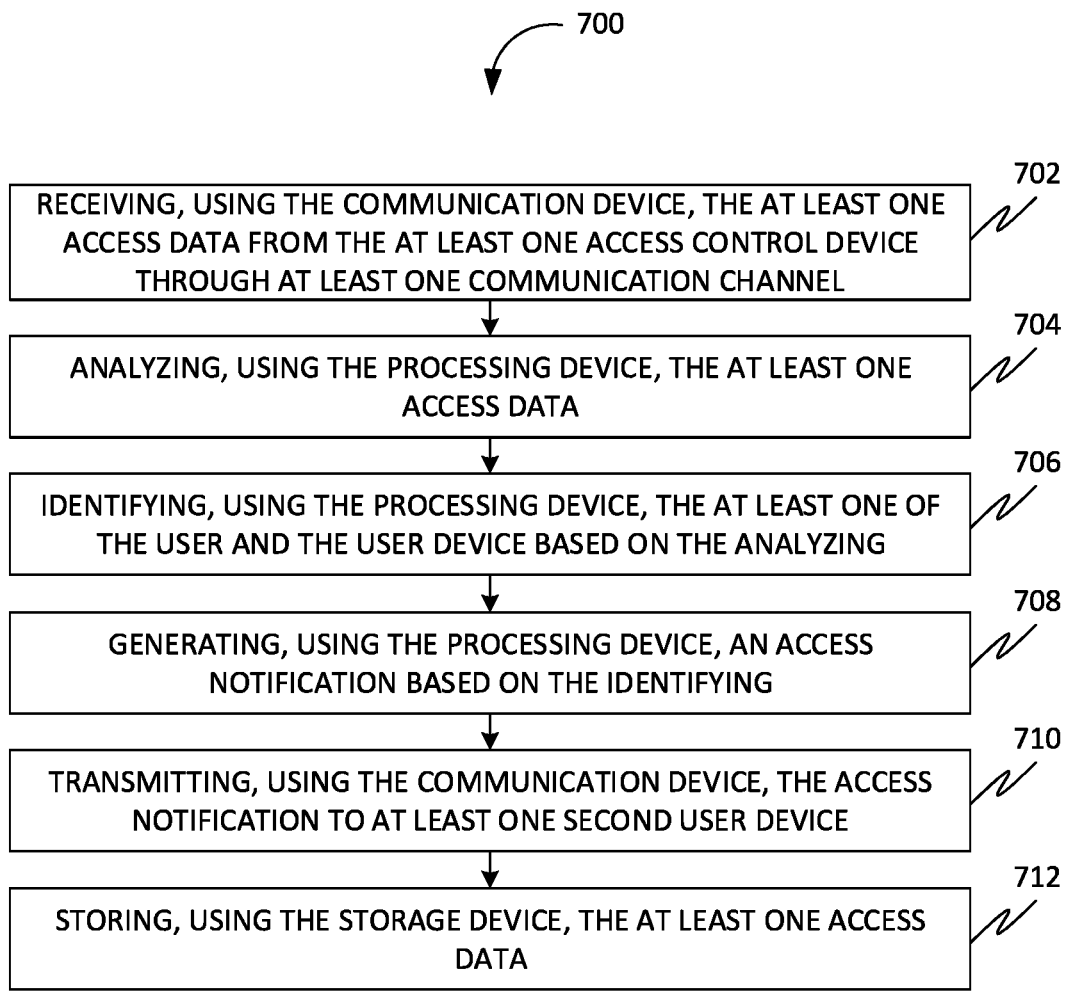
FIG. 7 is a flowchart of a method for generating an access notification, in accordance with some embodiments.

FIG. 7 is a flowchart of a method 700 for generating an access notification, in accordance with some embodiments. Accordingly, the at least one access control device may be configured for generating at least one access data based on the transitioning between the locked state and the unlocked state. Further, at 702, the method 700 may include receiving, using the communication device, the at least one access data from the at least one access control device through at least one communication channel. Further, the at least one access data may include the code and a state of the at least one access control device. Further, the state may include the locked state, the unlocked state, etc.

Further, at 704, the method 700 may include analyzing, using the processing device, the at least one access data.

Further, at 706, the method 700 may include identifying, using the processing device, the at least one of the user and the user device based on the analyzing.

Further, at 708, the method 700 may include generating, using the processing device, an access notification based on the identifying.

Further, at 710, the method 700 may include transmitting, using the communication device, the access notification to at least one second user device.

Further, at 712, the method 700 may include storing, using the storage device, the at least one access data.

Figure 8:
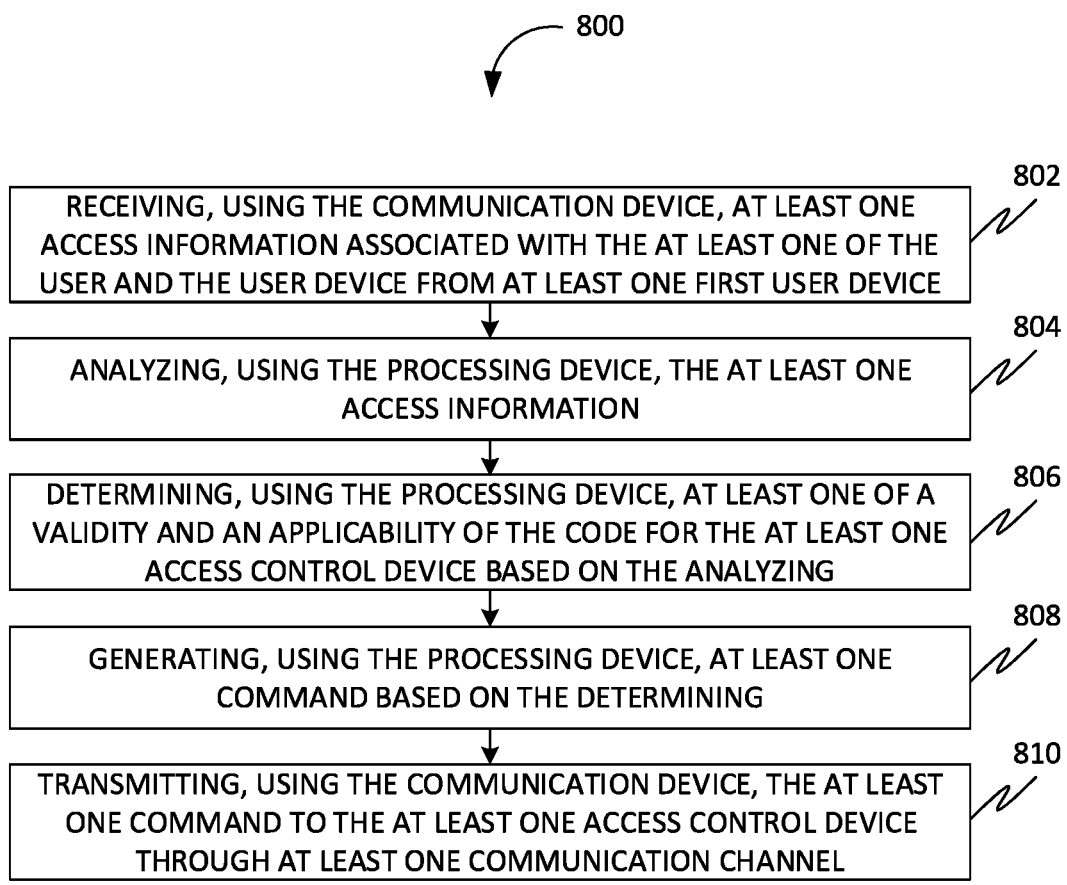
FIG. 8 is a flowchart of a method for generating at least one command, in accordance with some embodiments.

FIG. 8 is a flowchart of a method 800 for generating at least one command, in accordance with some embodiments. Accordingly, at 802, the method 800 may include receiving, using the communication device, at least one access information associated with the at least one of the user and the user device from at least one first user device. Further, the at least one access information may include a validity information of the code, an applicability of the code, etc.

Further, at 804, the method 800 may include analyzing, using the processing device, the at least one access information.

Further, at 806, the method 800 may include determining, using the processing device, at least one of a validity and an applicability of the code for the at least one access control device based on the analyzing.

Further, at 808, the method 800 may include generating, using the processing device, at least one command based on the determining.

Further, at 810, the method 800 may include transmitting, using the communication device, the at least one command to the at least one access control device through at least one communication channel. Further, the at least one access control device may be configured for either of including and removing the code based on the at least one command.

Figure 9:
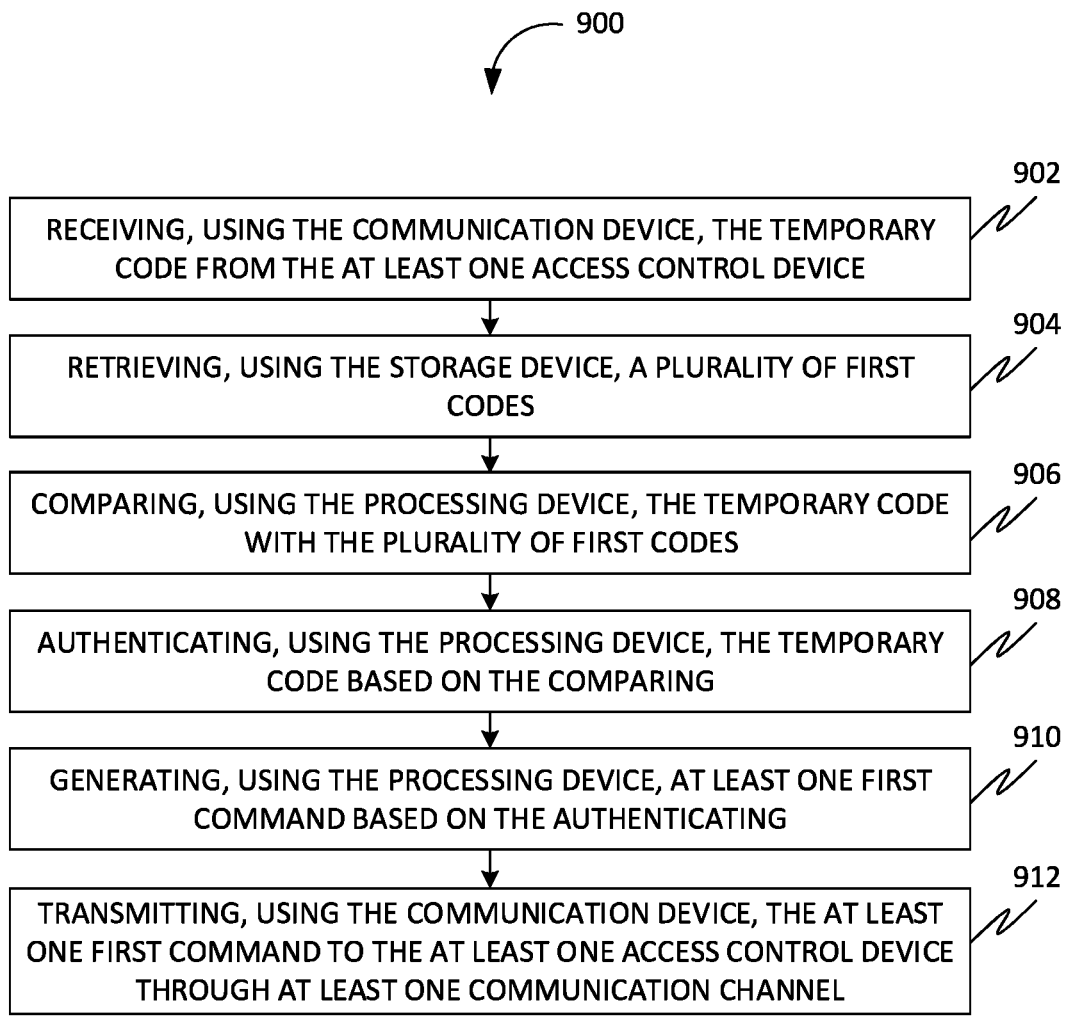
FIG. 9 is a flowchart of a method for generating at least one first command, in accordance with some embodiments.

FIG. 9 is a flowchart of a method 900 for generating at least one first command, in accordance with some embodiments. Further, the at least one access control device may be configured for receiving a temporary code based on at least one external action receivable by an input device comprised in the at least one access control device. Further, the input device may include a keypad. Further, at 902, the method 900 may include receiving, using the communication device, the temporary code from the at least one access control device.

Further, at 904, the method 900 may include retrieving, using the storage device, a plurality of first codes. Further, the plurality of first codes may be associated with a plurality of users. Further, the plurality of user may be authenticated for the at least one access control device.

Further, at 906, the method 900 may include comparing, using the processing device, the temporary code with the plurality of first codes.

Further, at 908, the method 900 may include authenticating, using the processing device, the temporary code based on the comparing.

Further, at 910, the method 900 may include generating, using the processing device, at least one first command based on the authenticating.

Further, at 912, the method 900 may include transmitting, using the communication device, the at least one first command to the at least one access control device through at least one communication channel. Further, the transitioning between the locked state and the unlocked state of the at least one access control device may be based on the at least one first command.

Figure 10:
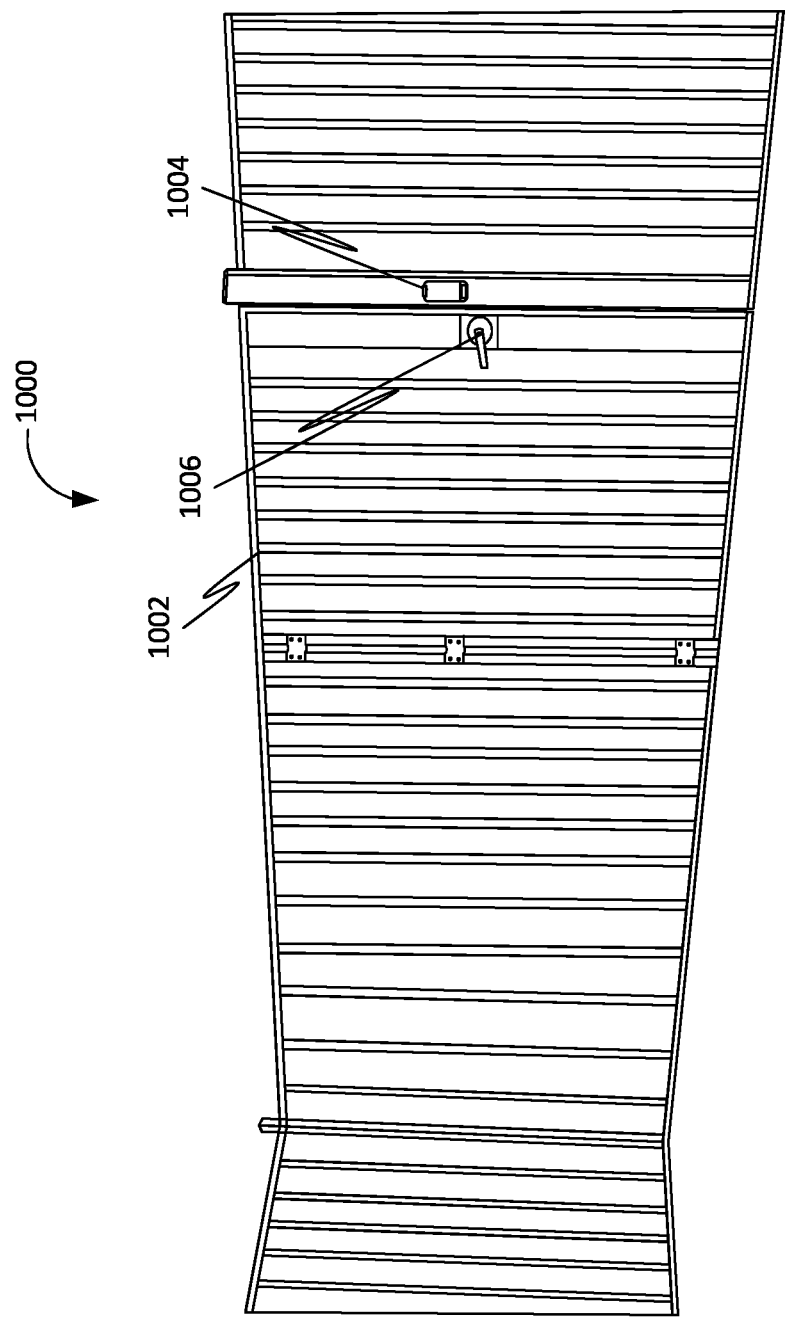
FIG. 10 is an apparatus for controlling access to an access control location, in accordance with some embodiments.

FIG. 10 is an apparatus 1000 for controlling access to an access control location, in accordance with some embodiments. Further, the apparatus 1000 may include at least one physical barrier 1002 and at least one access control device 1004.

Further, the at least one physical barrier 1002 may be disposed on at least one access control location. Further, the at least one physical barrier 1002 may include at least one gate, at least one door, at least one parking gate, etc. Further, the at least one physical barrier 1002 may provide controlled access to the at least one access control location. Further, the at least one physical barrier 1002 may include at least one lock mechanism 1006. Further, the at least one lock mechanism 1006 may be operationally coupled with the at least one access control device 1004. Further, the at least one access control device 1004 may be disposed on the at least one physical barrier 1002. Further, the at least one lock mechanism 1006 may be transitionable between an opened state and a closed state in an unlocked state of the at least one access control device 1004. Further, the at least one lock mechanism 1006 may not be transitionable between the opened state and the closed state in a locked state of the at least one access control device 1004. Further, the at least one access control device 1004 may be configured for receiving a code from a user device through the at least one short-range communication channel. Further, the at least one access control device 1004 may be configured for comparing the code with a plurality of codes. Further, the at least one access control device 1004 may be configured for transitioning between the locked state and the unlocked state based on the comparing of the code.

Figure 11:
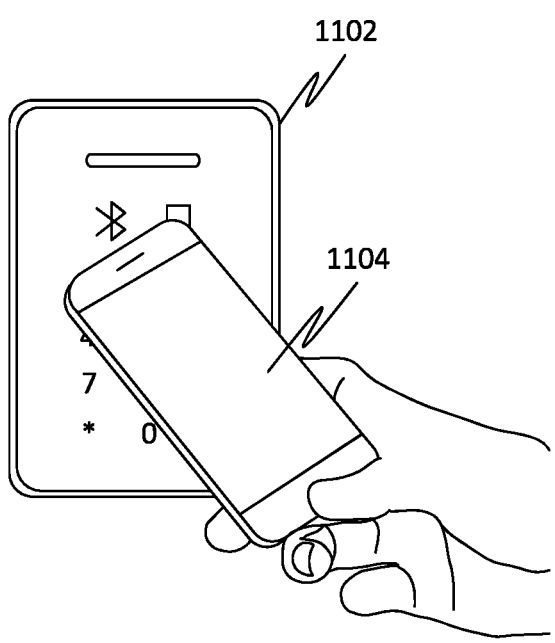
FIG. 11 is a front view of an access control device for controlling access to an access control location, in accordance with some embodiments.

FIG. 11 is a front view of an access control device 1102 for controlling access to an access control location, in accordance with some embodiments. Further, the access control device 1102 may be configured for receiving a code from a user device 1104 through the at least one short-range communication channel.

Figure 12:
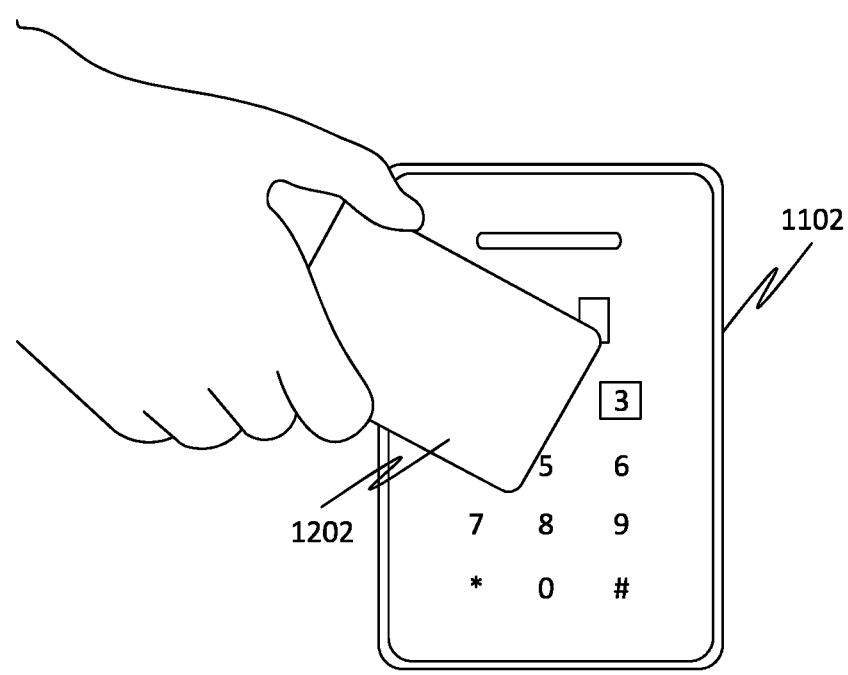
FIG. 12 is a front view of the access control device for controlling access to the access control location, in accordance with some embodiments.

FIG. 12 is a front view of the access control device 1102 for controlling access to the access control location, in accordance with some embodiments. Further, the access control device 1102 may be configured for receiving a code from an electronic access card 1202.

Figure 13:
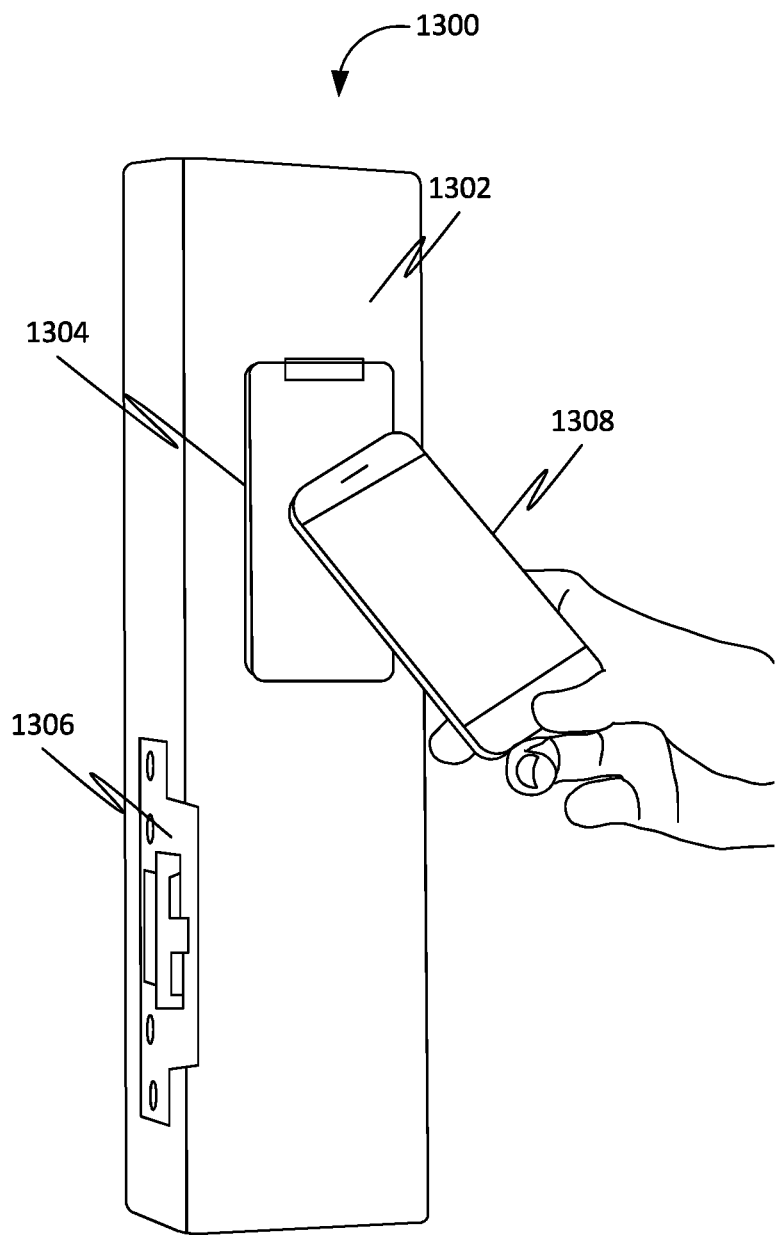
FIG. 13 is a perspective view of an apparatus for controlling access to an access control location, in accordance with some embodiments.

FIG. 13 is a perspective view of an apparatus 1300 for controlling access to an access control location, in accordance with some embodiments. Further, the apparatus 1300 may include a physical barrier, an access control device 1304, and a lock mechanism. Further, the lock mechanism may include at least one electrical lock, at least one strike, etc. Further, the physical barrier may be disposed on the access control location. Further, at least one wall 1302 and the physical barrier may be used for forming the access control location. Further, the physical barrier may provide controlled access to the access control location. Further, the lock mechanism may include a first lock part (not shown) and a second lock part 1306. Further, the first lock part may be disposed of on the physical barrier and the second lock part 1306 may be disposed on the at least one wall 1302. Further, the lock mechanism may be transitionable between an opened state and a closed state in an unlocked state of the access control device 1304. Further, the lock mechanism may not be transitionable between the opened state and the closed state in a locked state of the access control device 1304. Further, the access control device 1304 may be configured for receiving a code from a user device 1308 through the at least one short-range communication channel. Further, the access control device 1304 may be configured for comparing the code with a plurality of codes. Further, the access control device 1304 may be configured for transitioning between the locked state and the unlocked state based on the comparing of the code.

Figure 14:
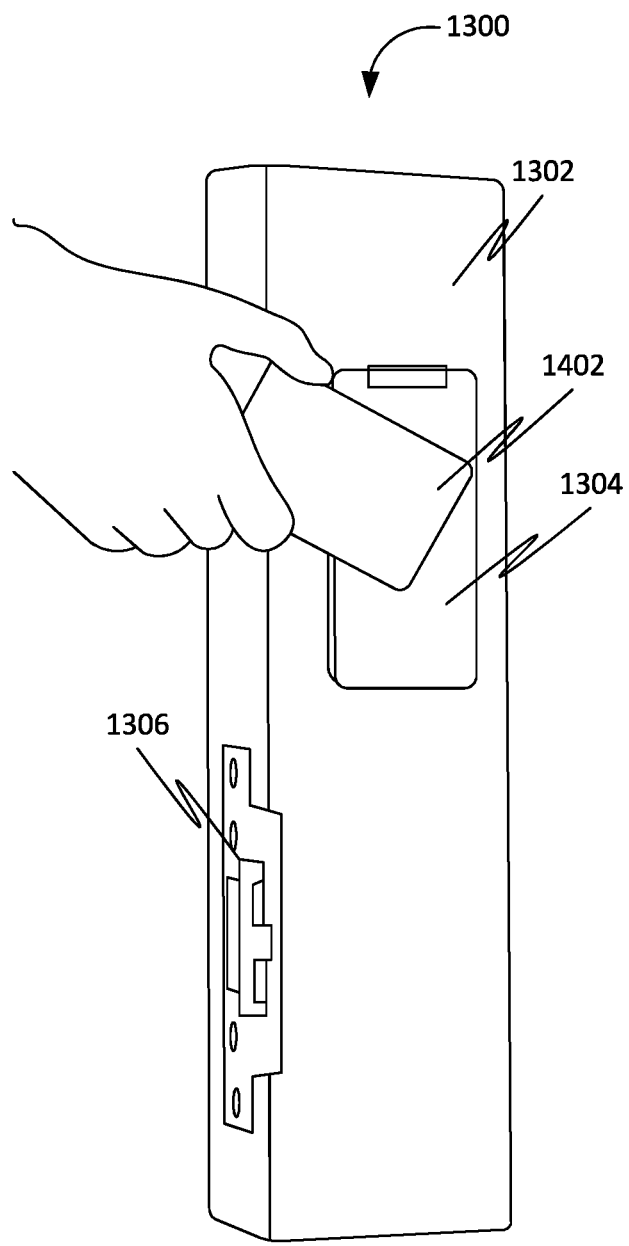
FIG. 14 is a perspective view of the apparatus for controlling access to the access control location, in accordance with some embodiments.

FIG. 14 is a perspective view of the apparatus 1300 for controlling access to the access control location, in accordance with some embodiments. Further, the access control device 1304 may be configured for receiving a code from an electronic access card 1402.

Figure 15:
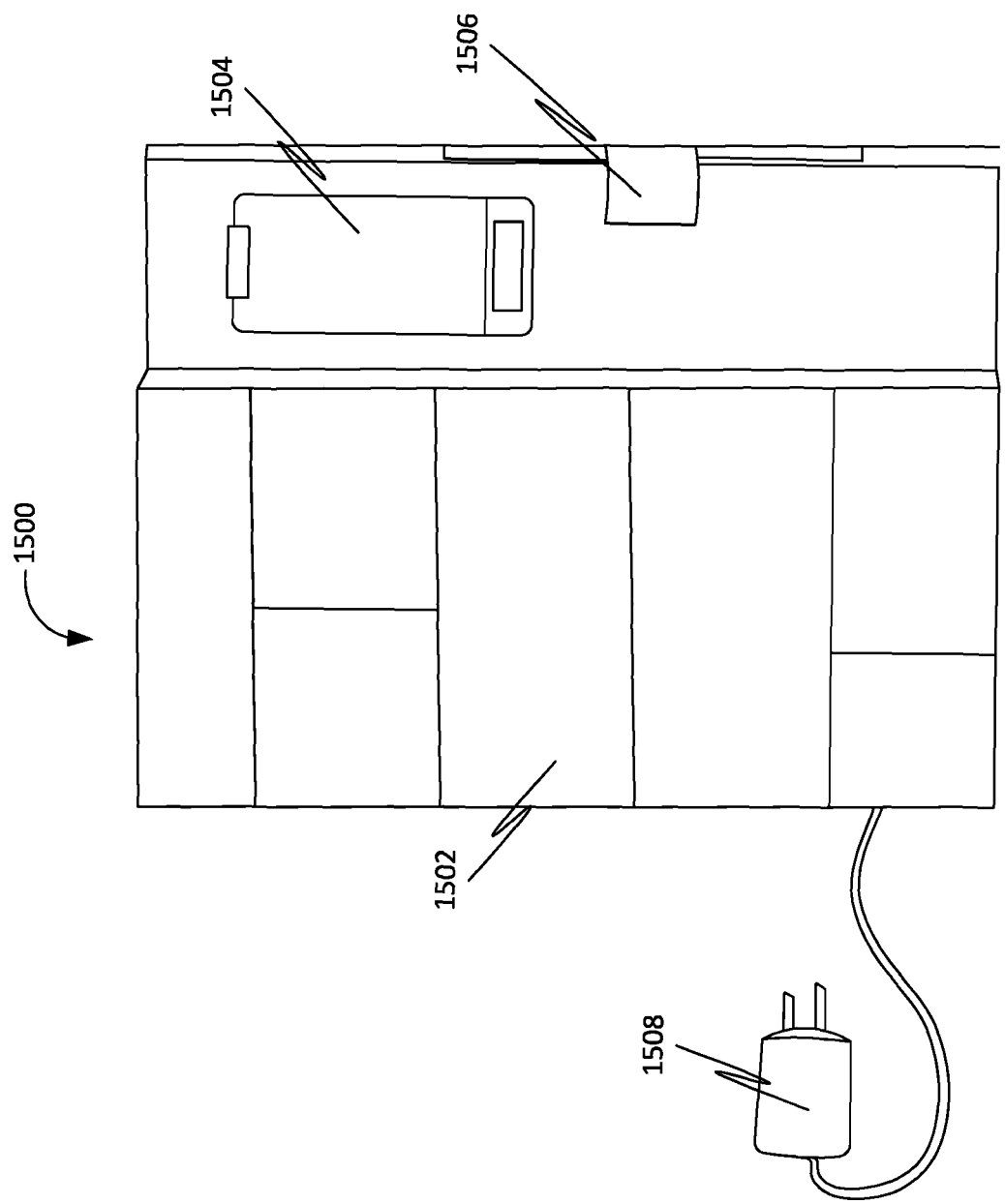
FIG. 15 is a front view of an apparatus for controlling access to an access control location, in accordance with some embodiments.
Figure 16:
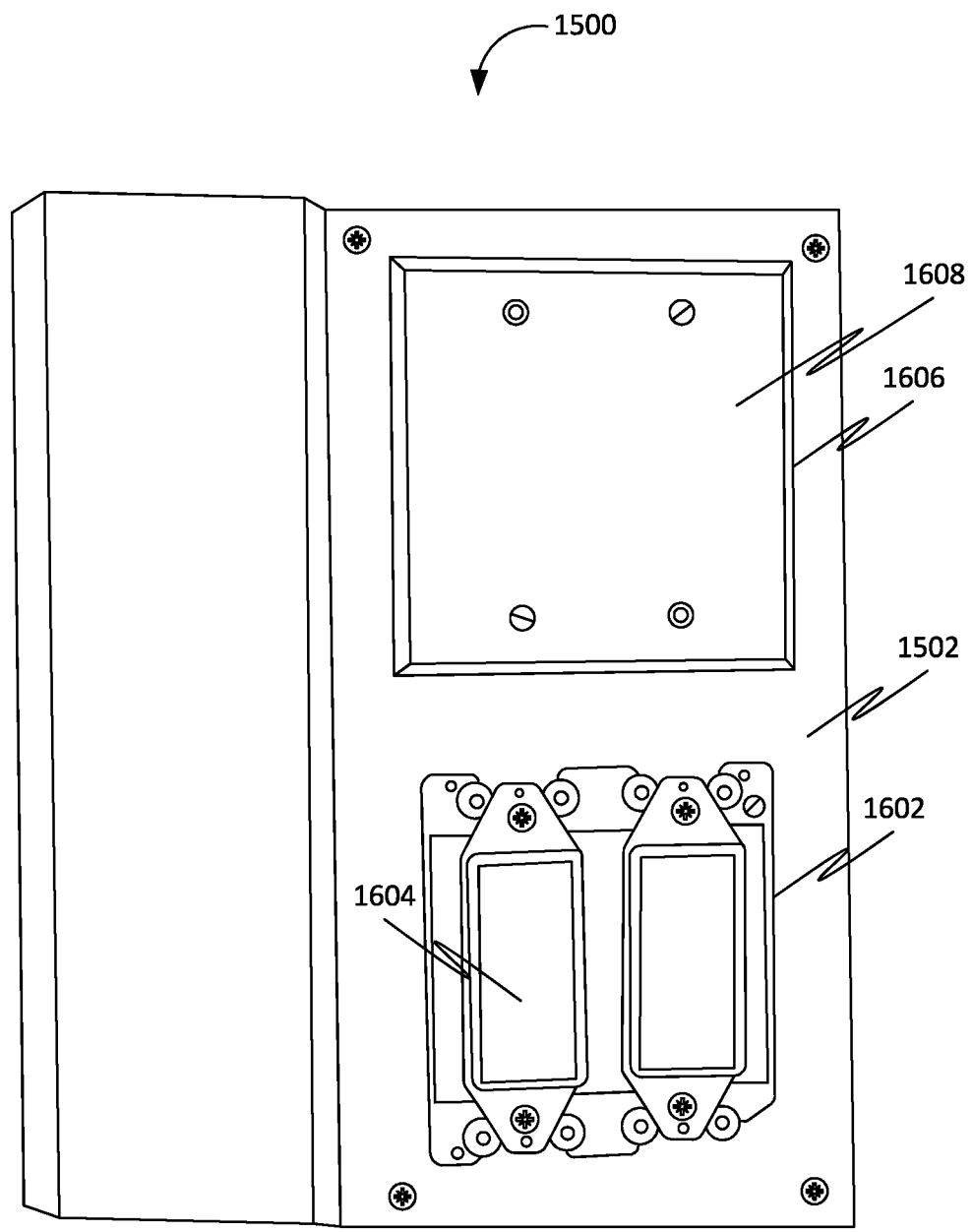
FIG. 16 is a rear view of the apparatus, in accordance with some embodiments.
Figure 17:
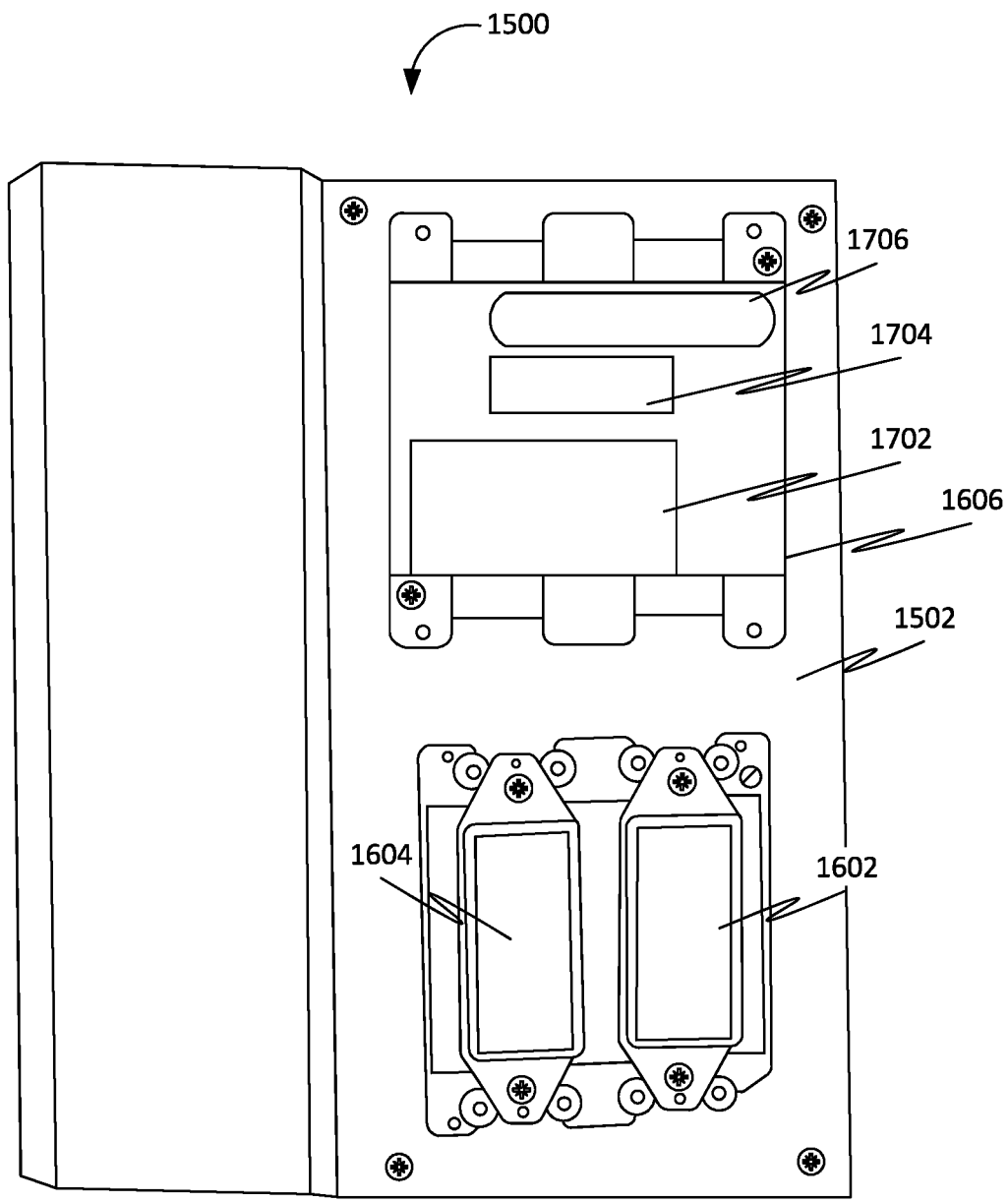
FIG. 17 is a rear view of the apparatus, in accordance with some embodiments.

FIG. 15 is a front view of an apparatus 1500 for controlling access to an access control location, in accordance with some embodiments. Further, the apparatus 1500 may include a physical barrier, an access control device 1504, a lock mechanism, at least one battery 1706 (as shown in FIG. 17), at least one controller 1704 (as shown in FIG. 17), at least one switch 1602-1604 (as shown in FIG. 16), at least one power source connector 1508, and a power supply 1702 (as shown in FIG. 17).

Further, the lock mechanism may include at least one electrical lock, at least one strike, etc.

Further, the physical barrier may be disposed on the access control location. Further, at least one wall 1502 and the physical barrier may be used for forming the access control location. Further, the physical barrier may provide controlled access to the access control location. Further, the lock mechanism may include a first lock part (not shown) and a second lock part 1506. Further, the first lock part may be disposed of on the physical barrier and the second lock part 1506 may be disposed on the at least one wall 1502. Further, the at least one wall 1502 may include a box 1606, as shown in FIG. 16. Further, the box 1606 may include an interior space and an opening leading into the box 1606. Further, the box 1606 may include a lid 1608, as shown in FIG. 16, for covering the opening of the box 1606. Further, the at least one battery 1706, the at least one controller 1704, and the power supply 1702 may be disposed of in the interior space of the box 1606.

Further, the access control device 1504 may be configured for receiving a code from a user device. Further, the access control device 1504 may be configured for comparing the code with a plurality of codes. Further, the access control device 1504 may be configured for generating a command based on the comparing.

Further, the at least one power source connector 1508 may be configured for connecting with at least one power source.

Further, the power supply 1702 may be electrically coupled with the at least one power source connector 1508. Further, the power supply 1702 may be configured for powering at least one of the access control device 1504, the lock mechanism, the at least one battery 1706, and the at least one controller 1704.

Further, the at least one battery 1706 may be configured for powering at least one of the access control device 1504, the lock mechanism, and the at least one controller 1704.

Further, the at least one switch 1602-1604 may be configurable for transitioning between an off-state and an on-state. Further, the at least one power source may be configured for powering the at least one of the access control device 1504, the lock mechanism, the at least one battery 1706, and the at least one controller 1704 based on a state of the at least one switch 1602-1604. Further, the state may include the on-state and the off-state.

Further, the at least one controller 1704 may be operationally coupled with the lock mechanism. Further, the at least one controller 1704 may be communicatively coupled with the access control device 1504. Further, the at least one controller 1704 may be configured for transitioning the lock mechanism between an opened state and a closed state based on the command. Further, the physical barrier may provide access to the access control location in the opened state. Further, the physical barrier may not provide access to the access control location in the closed state.

FIG. 16 is a rear view of the apparatus 1500, in accordance with some embodiments.

FIG. 17 is a rear view of the apparatus 1500, in accordance with some embodiments.

Figure 18:
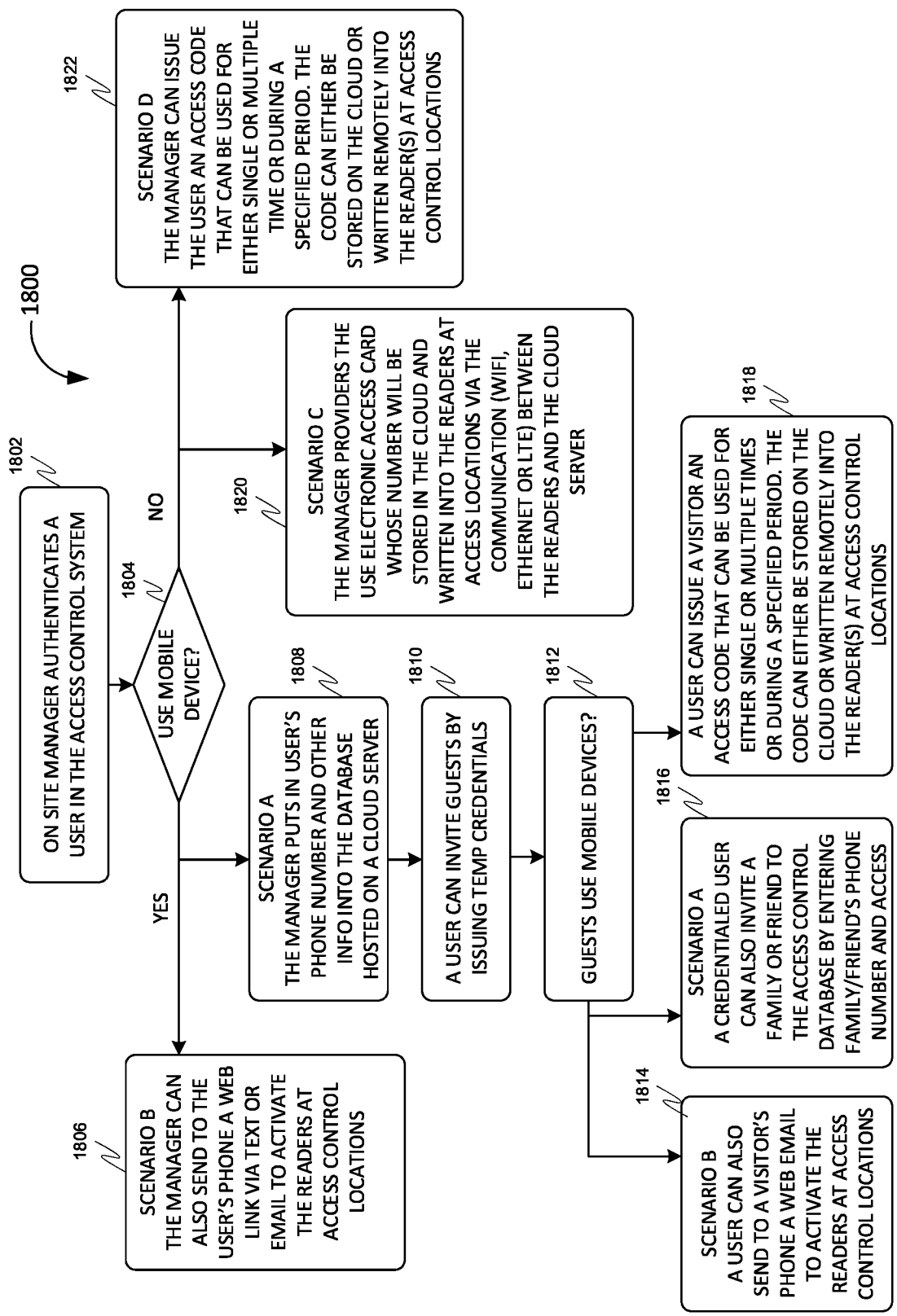
FIG. 18 is a flow diagram of a method for controlling access to an access control location, in accordance with some embodiments.

FIG. 18 is a flow diagram of a method 1800 for controlling access to an access control location, in accordance with some embodiments. Accordingly, at 1802, the method 1800 may include an on-site manager to authenticate a user in an access control system. Further, at 1804, the method 1800 may include checking for usage of the smartphone by the user. Further, at 1806, the method 1800 may include the manager sending to the user's phone a web link via text or email to activate the readers (such as the at least one access control device) at the access control location. Further, after 1804, at 1808, the method 1800 may include the manager putting (or registering) phone number and other info associated with the user into the database hosted on a cloud server. Further, at 1810, the method 1800 may include the user inviting guests by issuing temporary credentials. Further, at 1812, the method 1800 may include checking for the usage of a smartphone by the guests. Further, at 1814, the method 1800 may include the user to send a web link via text or email to a smartphone of a guest of the guests to activate the reader at the access control location. Further, at 1816, the method 1800 may include a credentialed user to invite a family or friend to the access control database by entering the phone number and access time frame of the family or the friend. Further, after 1812, at 1818, the method 1800 may include the user to issue a guest an access code that may be used for either single or multiple times or during a specified period. The access code may either be stored on the cloud or written remotely into the reader(s) at the access control location. Further, after 1804, at 1820, the method 1800 may include the manager providing the user electronic access card whose number may be stored in the cloud server and written into the reader at access locations via the communication (Wi-Fi, Ethernet, or LTE) between the reader and the cloud server. Further, after 1804, at 1822, the method 1800 may include the manager to issue the user the access code that may be used for either single or multiple times or during a specified period. The access code may either be stored on the cloud server or written remotely into the reader(s) at the access control location.

Figure 19:
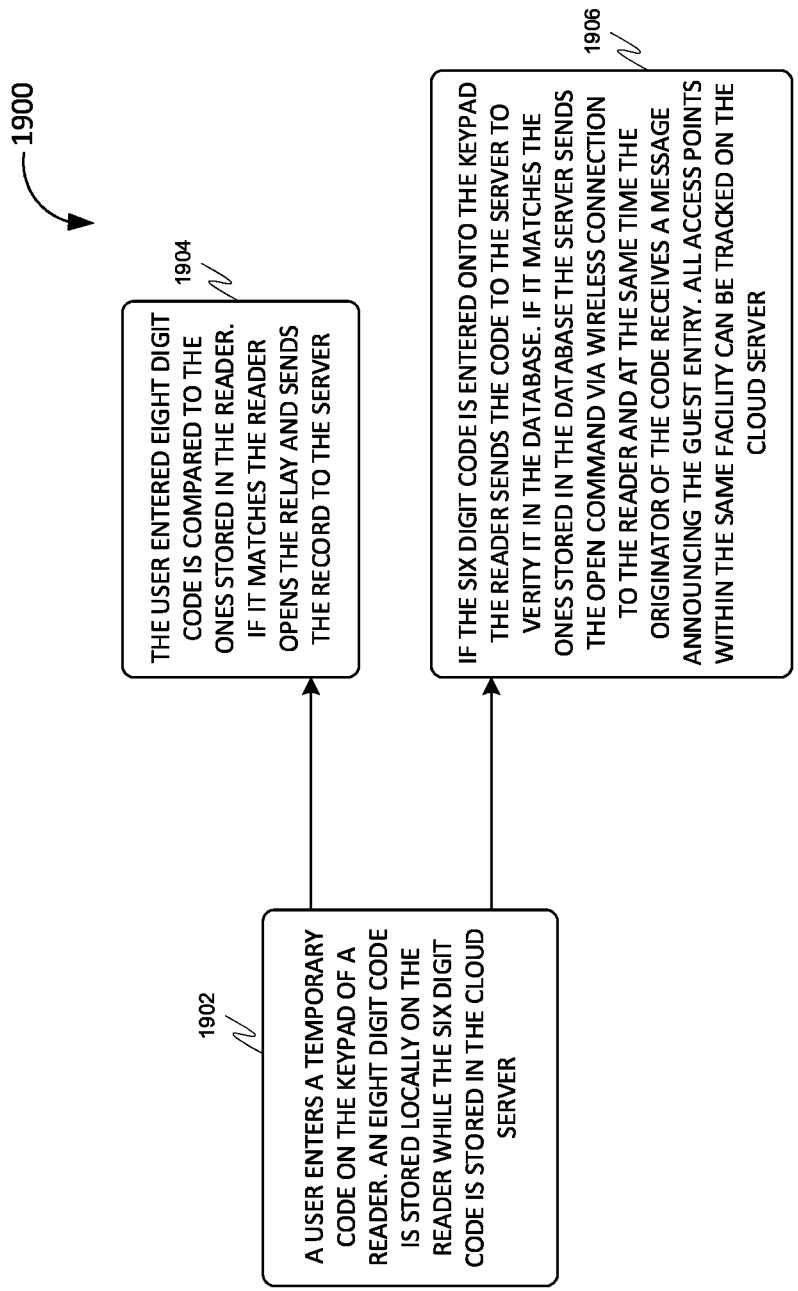
FIG. 19 is a flow diagram of a method for controlling access to an access control location using a keypad code, in accordance with some embodiments.

FIG. 19 is a flow diagram of a method 1900 for controlling access to an access control location using a keypad code, in accordance with some embodiments. Accordingly, at 1902, the method 1900 may include a user to enter a temporary code on a keypad of a reader (such as the at least one access control device). A first eight digit code is stored locally on the reader, while a first six digit code is stored in the cloud server. Further, at 1904, the method 1900 may include the user entering a second eight digit code that may be compared to the first eight digit code that may be stored in the reader. Further, upon matching of the second eight digit code with the first eight digit code, the reader opens the relay and sends the record to the cloud server. Further, after 1902, at 1906, the method 1900 may include matching the first six digit code with a second six digit code that may be entered onto the keypad, the reader sends the second six digit code to the cloud server to verify it in the database. Further, upon matching the second six digit code with the first six digit code, the cloud server sends an open command via wireless connection to the reader and at the same time the originator of the first six digit code receives a message announcing the guest entry. Further, all access points within the same facility may be tracked on the cloud server.

Figure 20:
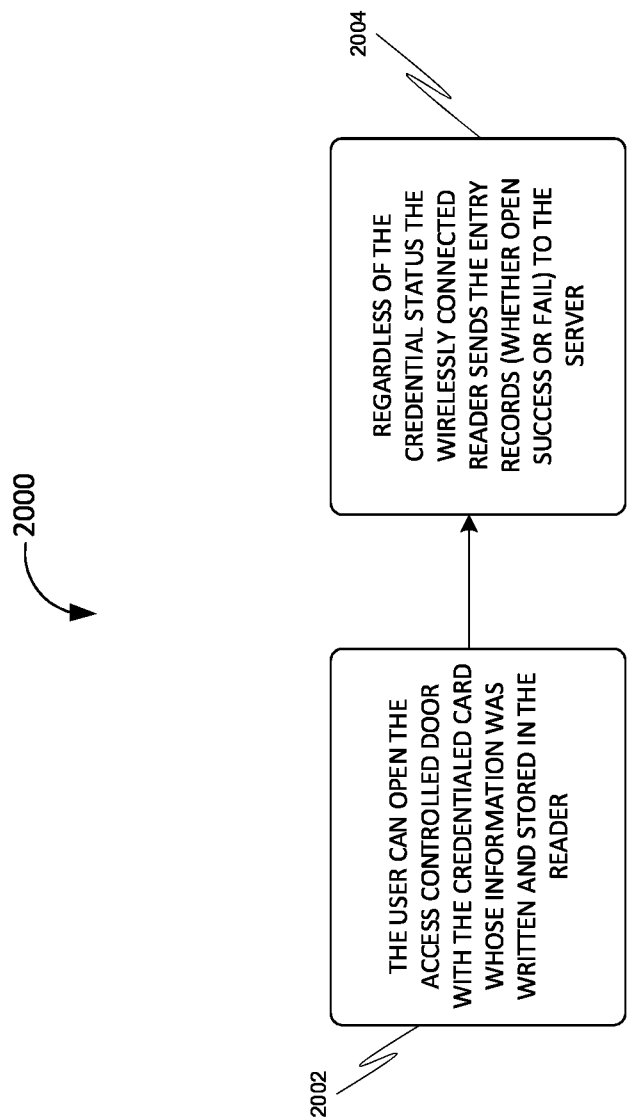
FIG. 20 is a flow diagram of a method for controlling access to an access control location using an electronic access card, in accordance with some embodiments.

FIG. 20 is a flow diagram of a method 2000 for controlling access to an access control location using an electronic access card, in accordance with some embodiments. Accordingly, at 2002, the method 2000 may include a user to open a gateway of the access control location with the electronic access card whose information may be written and stored in the reader. Further, at 2004, the method 2000 may include sending entry records associated with the user for accessing the access control location by a wirelessly connected reader (such as the at least one access control device) to a cloud server. Further, an entry record of the entry records may include one of success and failure.

Figure 21:
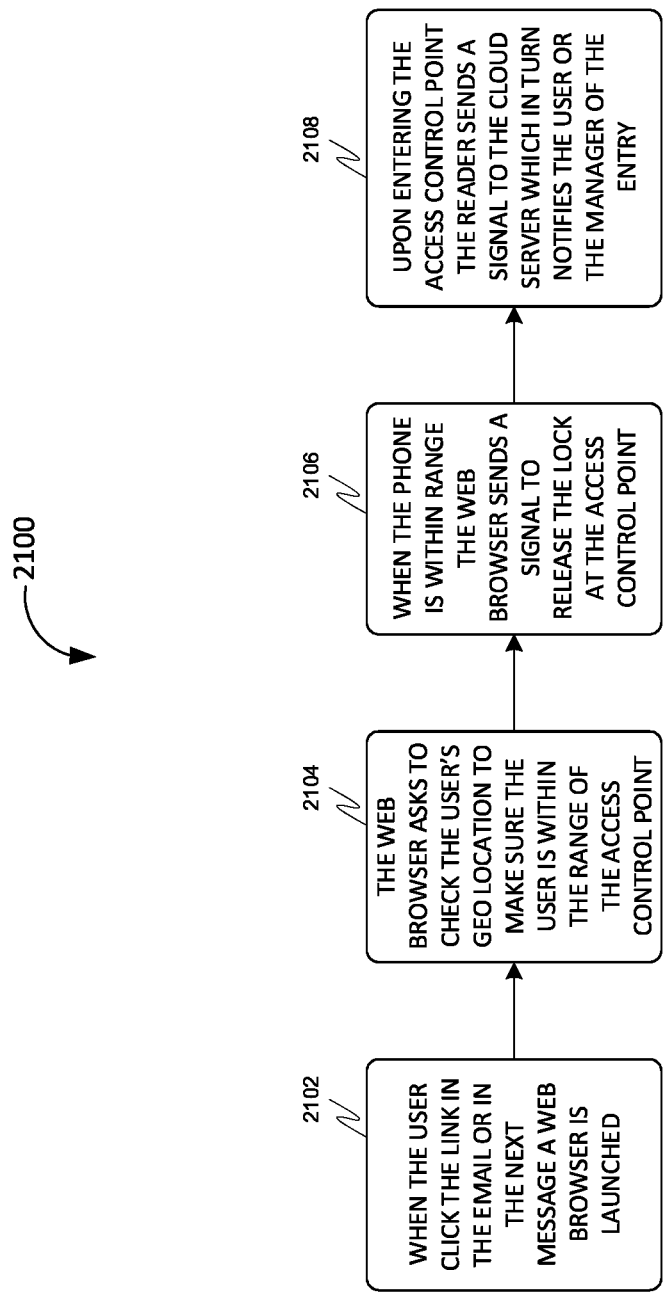
FIG. 21 is a flow diagram of a method for facilitating remotely activating a reader by a cloud server, in accordance with some embodiments.

FIG. 21 is a flow diagram of a method 2100 for facilitating remotely activating a reader by a cloud server, in accordance with some embodiments. Accordingly, at 2102, the method 2100 may include the launching of a web browser upon a user clicking a link in email or in a text message. Further, the reader may include the at least one access control device. Further, at 2104, the method 2100 may include the web browser checking a geolocation of the user to make sure that the user is within a range of an access control point. Further, at 2106, the method 2100 may include sending of a signal to release a lock at the access control point upon confirming the user in the range of the access control point. Further, at 2108, the method 2100 may include the reader sending a signal to the cloud server for notifying a manager of the entry upon the user entering the access control point.

Figure 22:
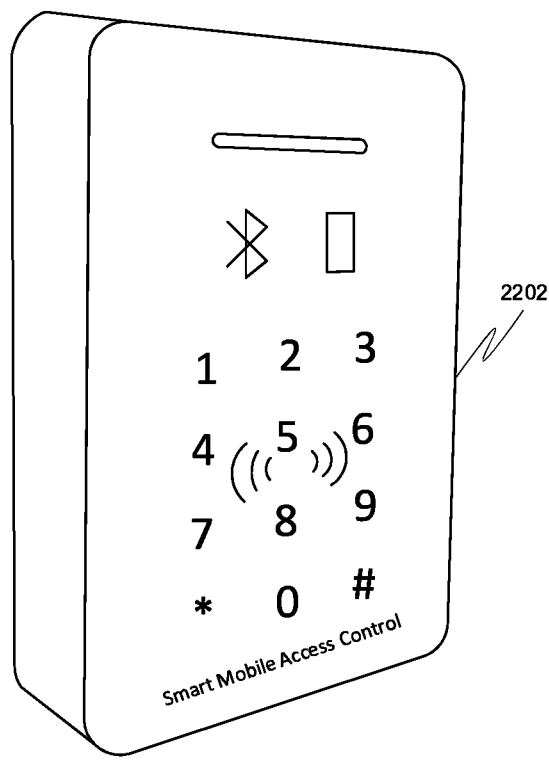
FIG. 22 is a perspective view of an access control device for controlling access to an access control location, in accordance with some embodiments.

FIG. 22 is a perspective view of an access control device 2202 for controlling access to an access control location, in accordance with some embodiments.

Figure 23:
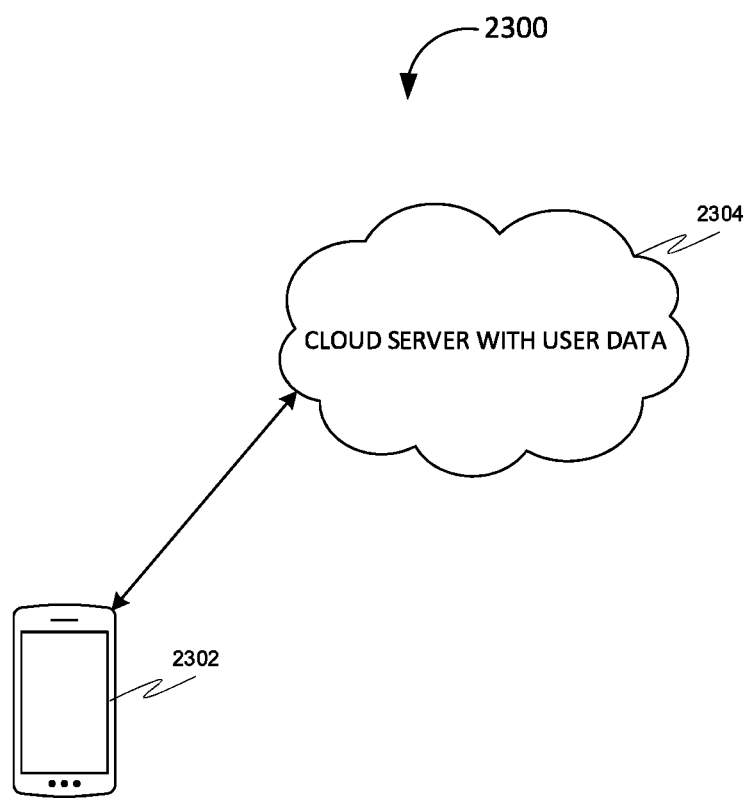
FIG. 23 is a schematic of a communicating network associated with the system for controlling access to an access control location, in accordance with some embodiments.

FIG. 23 is a schematic of a communicating network 2300 associated with the system 200 for controlling access to an access control location, in accordance with some embodiments. Accordingly, the communication network 2300 may include a smartphone 2302 associated with a user communicatively coupled with a cloud server 2304. Further, the user may download a software application associated with the system 200. Further, a phone number associated with the user may be checked upon logging in on the software application for the first time. Further, login credentials associated with the user may be sent to the cloud server 2304. Further, upon launching of the software application, the user may select a reader within a facility where access control points are available. Further, the cloud server 2304 may authenticate the phone number and return a code for the login credentials. Further, the cloud server 2304 may authenticate the user before sending an electronic key via a Bluetooth™ of the smartphone to the reader (such as the at least one access control device). Further, the reader may include a lock. Further, the smartphone 2302 sends an unlock request to the cloud server 2304 that checks the reader (or lock) operating hours and user access privilege before issuing the electronic key.

Figure 24:
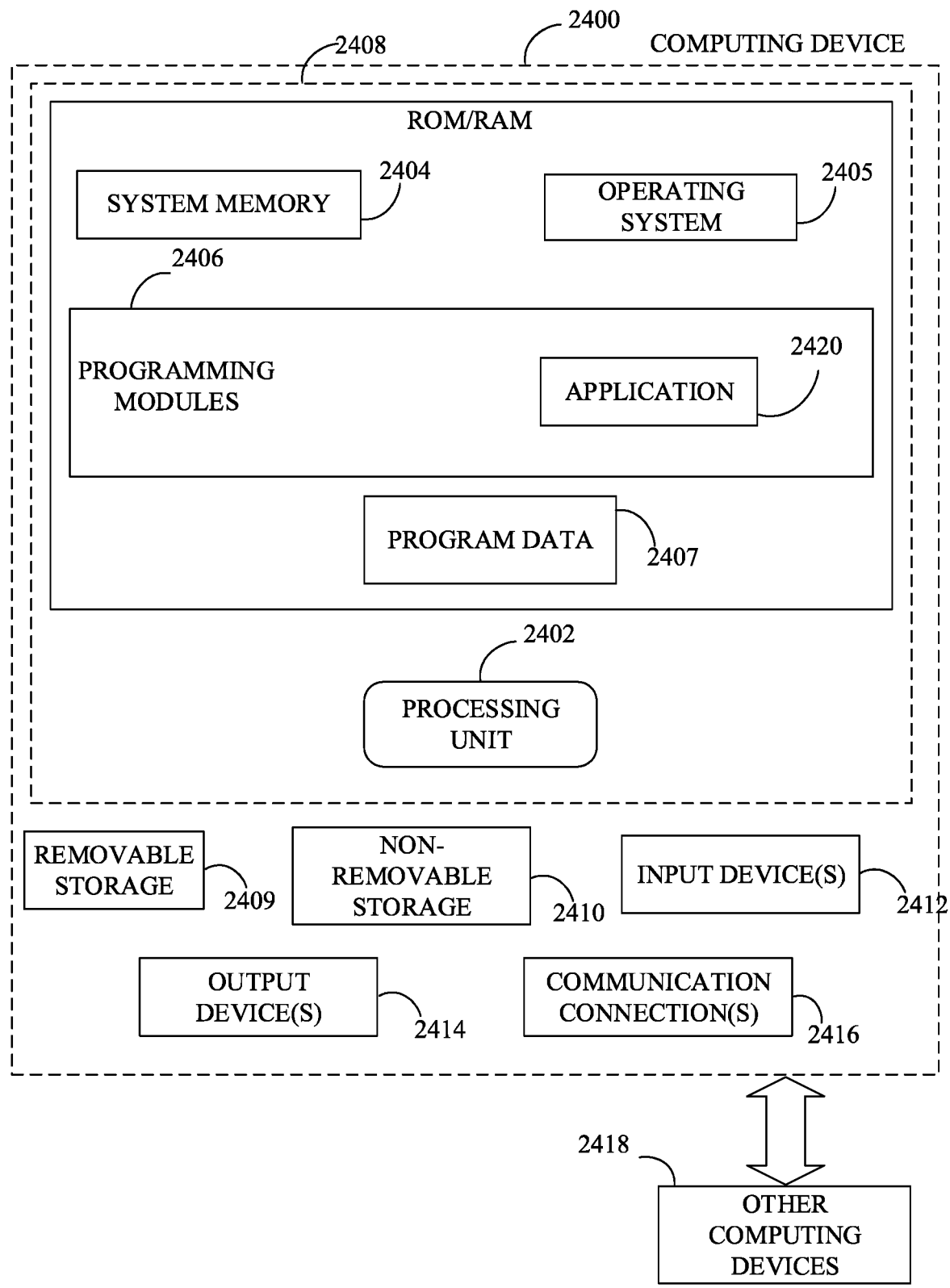
FIG. 24 is a block diagram of a computing device for implementing the methods disclosed herein, in accordance with some embodiments.

With reference to FIG. 24, a system consistent with an embodiment of the disclosure may include a computing device or cloud service, such as computing device 2400. In a basic configuration, computing device 2400 may include at least one processing unit 2402 and a system memory 2404. Depending on the configuration and type of computing device, system memory 2404 may comprise, but is not limited to, volatile (e.g. random-access memory (RAM)), non-volatile (e.g. read-only memory (ROM)), flash memory, or any combination. System memory 2404 may include operating system 2405, one or more programming modules 2406, and may include a program data 2407. Operating system 2405, for example, may be suitable for controlling computing device 2400's operation. In one embodiment, programming modules 2406 may include image-processing module. Furthermore, embodiments of the disclosure may be practiced in conjunction with a graphics library, other operating systems, or any other application program and is not limited to any particular application or system. This basic configuration is illustrated in FIG. 24 by those components within a dashed line 2408.

Computing device 2400 may have additional features or functionality. For example, computing device 2400 may also include additional data storage devices (removable and/or non-removable) such as, for example, magnetic disks, optical disks, or tape. Such additional storage is illustrated in FIG. 24 by a removable storage 2409 and a non-removable storage 2410. Computer storage media may include volatile and non-volatile, removable and non-removable media implemented in any method or technology for storage of information, such as computer-readable instructions, data structures, program modules, or other data. System memory 2404, removable storage 2409, and non-removable storage 2410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2400. Any such computer storage media may be part of device 2400. Computing device 2400 may also have input device(s) 2412 such as a keyboard, a mouse, a pen, a sound input device, a touch input device, a location sensor, a camera, a biometric sensor, etc. Output device(s) 2414 such as a display, speakers, a printer, etc. may also be included. The aforementioned devices are examples and others may be used.

Computing device 2400 may also contain a communication connection 2416 that may allow device 2400 to communicate with other computing devices 2418, such as over a network in a distributed computing environment, for example, an intranet or the Internet. Communication connection 2416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2404, including operating system 2405. While executing on processing unit 2402, programming modules 2406 (e.g., application 2420) may perform processes including, for example, one or more stages of methods, algorithms, systems, applications, servers, databases as described above. The aforementioned process is an example, and processing unit 2402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for controlling access to an access control location, the method comprising:
receiving, using a communication device, a request associated with at least one access control device from a user device, wherein the request comprises an identifier associated with at least one of a user and the user device, wherein the identifier is unique to the at least one of the user and the user device;
retrieving, using a storage device, a plurality of identifiers associated with at least one of a plurality of users and a plurality of user devices;
comparing, using a processing device, the identifier with the plurality of identifiers;
authenticating, using the processing device, the at least one of the user and the user device based on the comparing; and
transmitting, using the communication device, a code to the user device based on the authenticating, wherein the code is associated with the identifier, wherein the user device is configurable for transmitting the code to the at least one access control device through at least one short-range communication channel, wherein the at least one access control device is disposable in at least one access control location, wherein the at least one access control device comprises a plurality of codes, wherein the at least one access control device is configured for:
receiving the code from the user device through the at least one short-range communication channel;
comparing the code with the plurality of codes;
transitioning between a locked state and an unlocked state based on the comparing of the code;
wherein the at least one access control device is configured for generating at least one access data based on the transitioning between the locked state and the unlocked state,
wherein the method comprises:
receiving, using the communication device or the access control device, the at least one access data from the at least one access control device through at least one communication channel;
analyzing, using the processing device, the at least one access data;
identifying, using the processing device, the at least one of the user and the user device based on the analyzing;
generating, using the processing device, an access notification based on the identifying;
transmitting, using the communication device, the access notification to at least one second user device;
storing, using the storage device, the at least one access data;
wherein the at least one access control device is configured for:
interacting with at least one electronic access card based on an interaction of the at least one electronic access card receivable by at least one card interface comprised in the at least one access control device, wherein the at least one electronic access card comprises the code; and
receiving the code from the at least one electronic access card based on the interacting, wherein the comparing of the code with the plurality of codes is based on the receiving of the code from the at least one electronic access card.

2. The method of claim 1 further comprising:
receiving, using the communication device, at least one identifier associated with at least one of at least one user and at least one user device from at least one first user device;
generating, using the processing device, at least one code corresponding to the at least one of the at least one user and the at least one user device, wherein each code of the at least one code is unique to at least one of each user of the at least one user and each user device of the at least one user device; and
transmitting, using the communication device, the at least one code to the at least one access control device through at least one communication channel, wherein the at least one access control device is configured for including the at least one code based on the transmitting of the at least one code.

3. The method of claim 1, wherein the user device is configurable for establishing a connection with the at least one access control device through the at least one short-range communication channel based on a proximity between the user device and the at least one access control device, wherein the user device is configured for generating the request based on the establishing of the connection, wherein the receiving of the request from the user device is based on the generating of the request.

4. The method of claim 3, wherein the at least one access control device is associated with at least one access control device identifier, wherein the user device is configured for generating the at least one access control device identifier based on the establishing of the connection, wherein the request comprises the at least one access control device identifier.

5. The method of claim 1 further comprising:
analyzing, using the processing device, the request associated with the at least one access control device;
determining, using the processing device, at least one request information associated the request based on the analyzing;
retrieving, using the storage device, at least one access control device information associated with the at least one access control device; and
comparing, using the processing device, the at least one request information with the at least one access control device information, wherein the authenticating is based on the comparing of the at least one request information and the at least one access control device information.

6. The method of claim 5 further comprising:
retrieving, using the storage device, at least one of user information and user device information based on the request; and
comparing, using the processing device, the at least one of the user information and the user device information with the at least one access control device information, wherein the authenticating is based on the comparing of the at least one of the user information and the user device information and the at least one access control device information.

7. The method of claim 1 further comprising:
receiving, using the communication device, at least one access information associated with the at least one of the user and the user device from at least one first user device;
analyzing, using the processing device, the at least one access information;
determining, using the processing device, at least one of a validity and an applicability of the code for the at least one access control device based on the analyzing;

generating, using the processing device, at least one command based on the determining; and transmitting, using the communication device, the at least one command to the at least one access control device through at least one communication channel, wherein the at least one access control device is configured for either of including and removing the code based on the at least one command.

8. The method of claim 1 further comprising transmitting, using the communication device, the plurality of codes to the at least one access control device over a long range communication channel, wherein the at least one access control device comprises a memory device configured to store the plurality of codes.

9. The method of claim 1, wherein the at least one access control device is configured for receiving a temporary code based on at least one external action receivable by an input device comprised in the at least one access control device, wherein the method comprises:

receiving, using the communication device, the temporary code from the at least one access control device;

retrieving, using the storage device, a plurality of first codes;

comparing, using the processing device, the temporary code with the plurality of first codes;

authenticating, using the processing device, the temporary code based on the comparing;

generating, using the processing device, at least one first command based on the authenticating; and transmitting, using the communication device, the at least one first command to the at least one access control device through at least one communication channel, wherein the transitioning between the locked state and the unlocked state of the at least one access control device is based on the at least one first command.

10. A system for controlling access to an access control location, the system comprising:

at least one access control device, communicating independently to a processing and storage server over a long range communication channel;

a communication device configured for:

receiving a request associated with at least one access control device from a user device, wherein the request comprises an identifier associated with at least one of a user and the user device, wherein the identifier is unique to the at least one of the user and the user device;

transmitting a code to the user device based on authenticating, wherein the code is associated with the identifier, wherein the user device is configurable for transmitting the code to the at least one access control device through at least one short-range communication channel, wherein the at least one access control device is disposable in at least one access control location, wherein the at least one access control device comprises a plurality of codes, wherein the at least one access control device is configured for:

receiving the code from the user device through the at least one short-range communication channel;

comparing the code with the plurality of codes; and transitioning between a locked state and an unlocked state based on the comparing of the code;

a storage device configured for retrieving a plurality of identifiers associated with at least one of a plurality of users and a plurality of user devices; and a processing device communicatively coupled with the storage device and the communication device, wherein the processing device is configured:

comparing the identifier with the plurality of identifiers;

authenticating the at least one of the user and the user device based on the comparing;

wherein the at least one access control device is configured for generating at least one access data based on the transitioning between the locked state and the unlocked state, wherein the communication device is further configured for:

receiving the at least one access data from the at least one access control device through at least one communication channel; and transmitting an access notification to at least one second user device, wherein the processing device is further configured for:

analyzing the at least one access data;

identifying the at least one of the user and the user device based on the analyzing;

generating the access notification based on the identifying, wherein the storage device is further configured for storing the at least one access data;

wherein the at least one access control device is configured for:

interacting with at least one electronic access card based on an interaction of the at least one electronic access card receivable by at least one card interface comprised in the at least one access control device, wherein the at least one electronic access card comprises the code; and receiving the code from the at least one electronic access card based on the interacting, wherein the comparing of the code with the plurality of codes is based on the receiving of the code from the at least one electronic access card.

11. The system of claim 10, wherein the communication device is further configured for:

receiving at least one identifier associated with at least one of at least one user and at least one user device from at least one first user device; and transmitting at least one code to the at least one access control device through at least one communication channel, wherein the at least one access control device is configured for including the at least one code based on the transmitting of the at least one code, wherein the processing device is further configured for generating the at least one code corresponding to the at least one of the at least one user and the at least one user device, wherein each code of the at least one code is unique to at least one of each user of the at least one user and each user device of the at least one user device.

12. The system of claim 10, wherein the processing device is further configured for:

analyzing the request associated with the at least one access control device;

determining at least one request information associated the request based on the analyzing; and comparing the at least one request information with at least one access control device information, wherein the authenticating is based on the comparing of the at least one request information and the at least one access control device information, wherein the storage device is further configured for retrieving the at least one access control device information associated with the at least one access control device.

13. The system of claim 12, wherein the storage device is further configured for retrieving at least one of user information and user device information based on the request, wherein the processing device is further configured for comparing the at least one of the user information and the user device information with the at least one access control device information, wherein the authenticating is based on the comparing of the at least one of the user information and the user device information and the at least one access control device information.

14. The system of claim 10, wherein the communication device is further configured for
- receiving at least one access information associated with the at least one of the user and the user device from at least one first user device; and
- transmitting at least one command to the at least one access control device through at least one communication channel, wherein the at least one access control device is configured for either of including and removing the code based on the at least one command, wherein the processing device is further configured for:
- analyzing the at least one access information;
- determining at least one of a validity and an applicability of the code for the at least one access control device based on the analyzing; and
- generating the at least one command based on the determining.

15. The system of claim 10, wherein the at least one access control device is configured for:
- interacting with at least one electronic access card based on an interaction of the at least one electronic access card receivable by at least one card interface comprised in the at least one access control device, wherein the at least one electronic access card comprises the code; and
- receiving the code from the at least one electronic access card based on the interacting, wherein the comparing of the code with the plurality of codes is based on the receiving of the code from the at least one electronic access card.

16. The system of claim 10, wherein the at least one access control device is configured for receiving a temporary code based on at least one external action receivable by an input device comprised in the at least one access control device, wherein the communication device is further configured for:
- receiving the temporary code from the at least one access control device; and
- transmitting at least one first command to the at least one access control device through at least one communication channel, wherein the transitioning between the locked state and the unlocked state of the at least one access control device is based on the at least one first command, wherein the storage device is further configured for retrieving a plurality of first codes, wherein the processing device is further configured for:
- comparing the temporary code with the plurality of first codes;
- authenticating the temporary code based on the comparing; and
- generating the at least one first command based on the authenticating.

17. The method of claim 10, wherein the communication device is further configured for transmitting the plurality of codes to the at least one access control device over a long range communication channel, wherein the at least one access control device comprises a memory device configured to store the plurality of codes.

* * * * *